United States Patent
Nakaya et al.

(10) Patent No.: US 7,531,789 B2
(45) Date of Patent: May 12, 2009

(54) IMAGE PROCESSING APPARATUS, IMAGE READING DEVICE, AND IMAGE FORMING DEVICE

(75) Inventors: Fumio Nakaya, Kanagawa (JP); Hirokazu Ichikawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/798,257

(22) Filed: May 11, 2007

(65) Prior Publication Data
US 2008/0128593 A1 Jun. 5, 2008

(30) Foreign Application Priority Data
Nov. 30, 2006 (JP) ............... 2006-323789

(51) Int. Cl.
G03G 21/00 (2006.01)
H04N 1/04 (2006.01)
G06F 15/00 (2006.01)

(52) U.S. Cl. ............... 250/226; 358/1.9; 358/504; 358/520

(58) Field of Classification Search ............ 250/214 R, 250/214 AG, 226; 358/1.9, 504, 518–523
See application file for complete search history.

(56) References Cited

U.S. PATENT DOCUMENTS

| | | | | | |
|---|---|---|---|---|---|
| 5,771,311 | A | * | 6/1998 | Arai | 382/162 |
| 5,864,834 | A | * | 1/1999 | Arai | 706/16 |
| 6,654,150 | B1 | * | 11/2003 | Rozzi | 358/520 |
| 6,856,354 | B1 | * | 2/2005 | Ohsawa | 348/370 |
| 6,879,716 | B1 | * | 4/2005 | Ishibashi | 382/166 |
| 7,173,733 | B2 | * | 2/2007 | Nino et al. | 358/1.9 |
| 2004/0090640 | A1 | * | 5/2004 | Nino et al. | 358/1.9 |
| 2005/0018223 | A1 | * | 1/2005 | Debevec et al. | 358/1.9 |
| 2006/0077488 | A1 | * | 4/2006 | Zhang et al. | 358/504 |
| 2007/0043527 | A1 | * | 2/2007 | Quan et al. | 702/104 |
| 2007/0242293 | A1 | * | 10/2007 | Owens | 358/1.9 |
| 2007/0242295 | A1 | * | 10/2007 | Owens et al. | 358/1.9 |
| 2007/0242296 | A1 | * | 10/2007 | Owens | 358/1.9 |
| 2008/0128593 | A1 | * | 6/2008 | Nakaya et al. | 250/214 AG |
| 2008/0137110 | A1 | * | 6/2008 | Mestha et al. | 358/1.9 |
| 2008/0137154 | A1 | * | 6/2008 | Nakaya et al. | 358/474 |

FOREIGN PATENT DOCUMENTS

JP 61-84150 4/1986
JP 5-110767 4/1993

* cited by examiner

Primary Examiner—John R Lee
(74) Attorney, Agent, or Firm—Morgan, Lewis & Bockius LLP

(57) ABSTRACT

An image processing device includes: a spectral reflectance calculation unit that calculates a spectral reflectance on the basis of intensities of reflection light and irradiation intensities; a color value calculation unit that obtains color values based on the spectral reflectance; a coefficient calculation unit that calculates coefficients respectively for a plurality of predetermined eigenvectors where the color values are expressed by a linear combination between the plurality of predetermined eigenvectors, the coefficients, and spectral energies of at least two types of irradiation light; and an output unit that generates and outputs information corresponding to estimation values within a wavelength range defined by excluding at least one of a low and a high wavelength ranges from the wavelength range including the wavelengths of visible light, among estimation values of the spectral reflectances expressed by linear combination between the respective coefficients calculated by the coefficient calculation unit and the eigenvectors.

8 Claims, 11 Drawing Sheets

IMAGE PROCESSING APPARATUS, IMAGE READING DEVICE, AND IMAGE FORMING DEVICE

This application claims the benefit of Japanese Patent Application No. 2006-323789 filed Nov. 30, 2006, which is hereby incorporated by reference.

BACKGROUND OF THE INVENTION

The present invention relates to an image processing device, image reading device, and image forming device.

BACKGROUND OF THE RELATED ART

To scan an object such as a document to be imaged by using an image forming device having a scanner device, reflection light from the document is detected within wavelength ranges of three colors, namely, red, green, and blue by a light receiving element such as a line sensor while illuminating the document with light. The image forming device generates multivalued image data which includes four color components of yellow, magenta, cyan, and black through a predetermined image process of, for example, obtaining spectral reflectances in the respective wavelength ranges. The more the number of colors that can be detected by the light receiving element, the more the number of colors that can be expressed by combinations of spectral reflectances within the respective wavelength ranges. Accordingly, images can be formed with colors of the original object reproduced with more fidelity. Hence, there has long been a demand for a technique by which it is possible to detect a high range of wavelengths of reflection light reflected from an object to be imaged; i.e., a technique for reading an object in as many colors as possible.

SUMMARY OF THE INVENTION

According to one aspect of the invention, there is provided an image processing device including: a spectral reflectance calculation unit that calculates a spectral reflectance within a wavelength range including wavelengths of visible light, for each of at least two types of irradiation light having respectively different spectral energy distributions, on the basis of intensities of reflection light reflected from an object to be imaged when the object to be imaged is irradiated with at least two types of irradiation light and on the basis of irradiation intensities of at least two types of irradiation light; a color value calculation unit that obtains color values based on the spectral reflectances calculated by the spectral reflectance calculation unit; a coefficient calculation unit that calculates coefficients respectively for a plurality of predetermined eigenvectors where the color values are expressed by a linear combination between the plurality of predetermined eigenvectors, the coefficients, and spectral energies of at least two types of irradiation light; and an output unit that generates and outputs information corresponding to estimation values within a wavelength range defined by excluding at least one of low and high wavelength ranges from the wavelength range including the wavelengths of visible light, among estimation values of the spectral reflectances expressed by a linear combination between the respective coefficients calculated by the coefficient calculation unit and the eigenvectors.

BRIEF DESCRIPTION OF THE DRAWINGS

Exemplary embodiments of the present invention will be described in detail based on.

DETAILED DESCRIPTION OF THE PREFERRED EMBODIMENTS

Exemplary embodiments for practicing the invention will now be described. The following description will be made referring to a case where an object O to be imaged is a sheet-like object, for example. However, the object O to be imaged is not limited only to a sheet-like object such as an OHP sheet or the like but may have any type of shape. In the embodiments, a "visible light range" refers to a range of wavelengths of approximately 380 to 780 mm.

Figure 1:
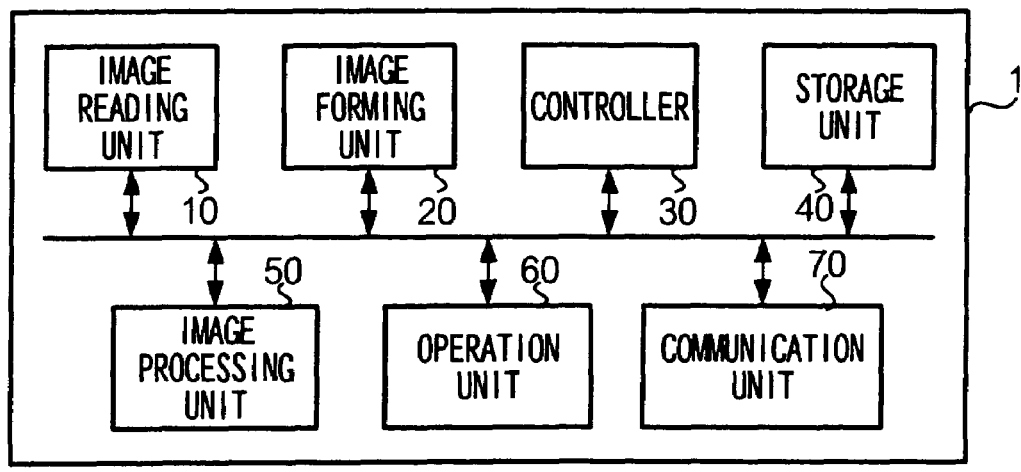
FIG. 1 is a block diagram showing a functional structure of an image forming device according to the first embodiment.

FIG. 1 is a block diagram showing a functional structure of an image forming device 1 according to the first embodiment. The image forming device 1 has an image reading unit 10, image forming unit 20, controller 30, storage unit 40, image processing unit 50, manipulation unit 60, and communication unit 70. The image reading unit 10 reads an image or the like from a printed material or the like. The image forming unit 20 forms an image on a recording sheet (or recording medium) on the basis of image data. The controller 30 is an arithmetic unit including a CPU (Central Processing Unit), RAM (Random Access Memory), ROM (Read Only Memory), and the like. The storage unit 40 is a memory device, such as a HD (Hard Disk), which stores various data and programs describing operation procedures to be executed by the controller 30. The image processing unit 50 performs image processing on image data. The image processing unit 50 includes Plural image processing circuits such as ASIC (Application Specific Integrated Circuit) and LSI (Large Scale Integration), an image memory for temporarily storing image data. In the image processing unit 50, the image processing circuits respectively perform various types of image processing. The manipulation unit 60 includes a user interface having various buttons or a liquid crystal display with a touch panel. The communication unit 70 is an interface device for communicating via a network.

Figure 2:
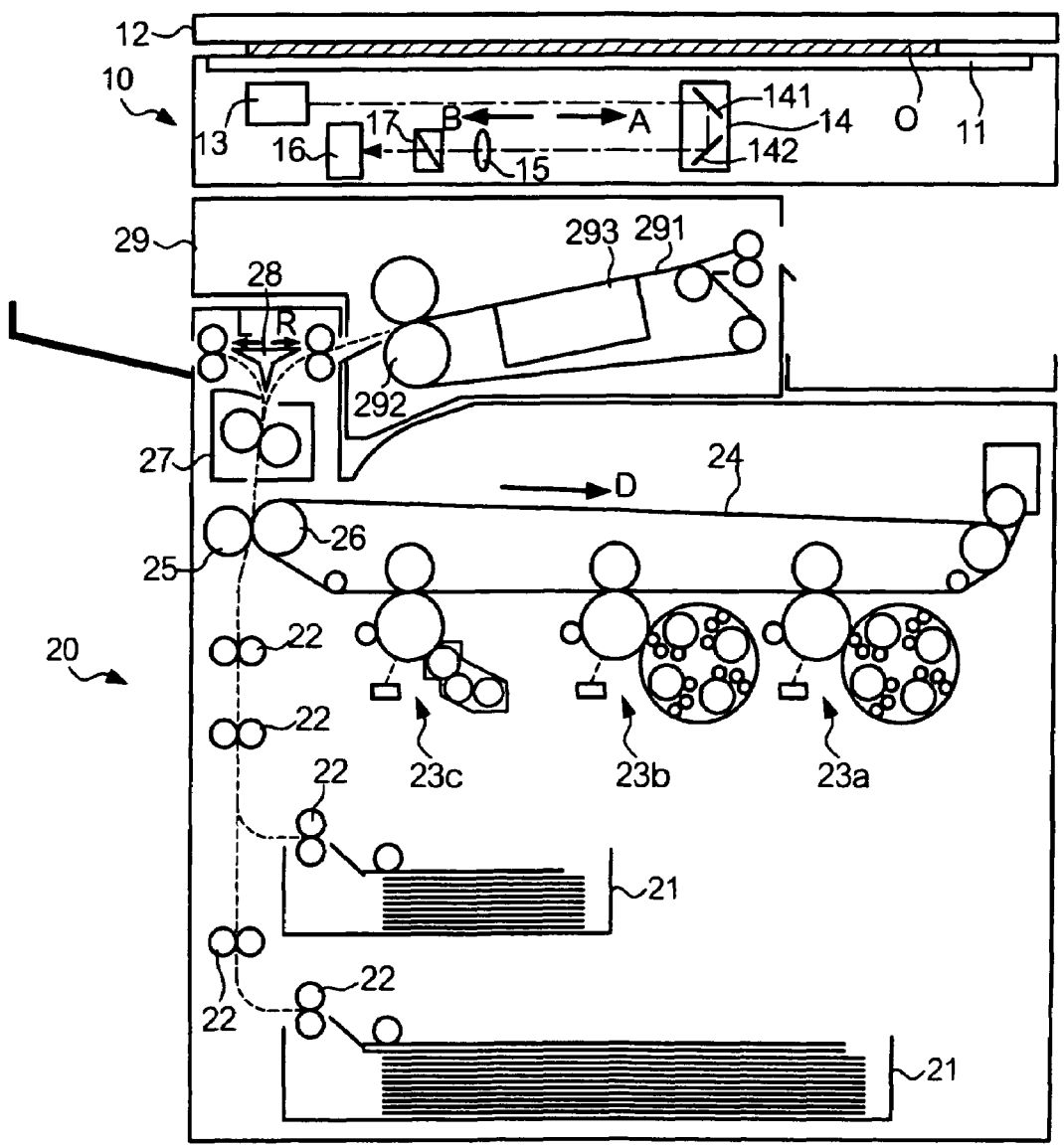
FIG. 2 depicts a structure of the image forming device according to the first embodiment.

FIG. 2 schematically shows a structure including the image reading unit 10 and image forming unit 20.

The image reading unit 10 has a function of a so-called image scanner. The image forming unit 20 has a function of a so-called printer. The image reading unit 10 includes a platen glass 11, platen cover 12, full-rate carriage 13, half-rate carriage 14, imaging lens 15, and line sensor 16.

The platen glass 11 is a glass plate on which the object O to be imaged is put. The platen glass 11 is provided with surfaces positioned horizontally. On a surface of the platen glass 11, a reflex inhibition layer made of a multi-layered dielectric film or the like is formed to reduce reflection on the surface of the platen glass 11. The reflex inhibition layer is provided to prevent a reflection light component from the surface of the object O to be imaged, which has to be read primarily, from being read synthesized with an unnecessary reflection light component from the surface of the platen glass 11. Aiming for separation between the reflection light component from the object O and the reflection light component from the surface of the platen glass 11, the surface of the object O to be imaged and the surface of the platen glass 11 may be set apart from each other by a predetermined clearance, for example, by providing a spacer. The platen cover 12 is provided so as to cover the platen glass 11. External light is shielded by the platen cover 12 to facilitate reading of the object O put on the platen cover 11.

A structure of the full-rate carriage 13 mentioned above will now be described in detail.

Figure 3:
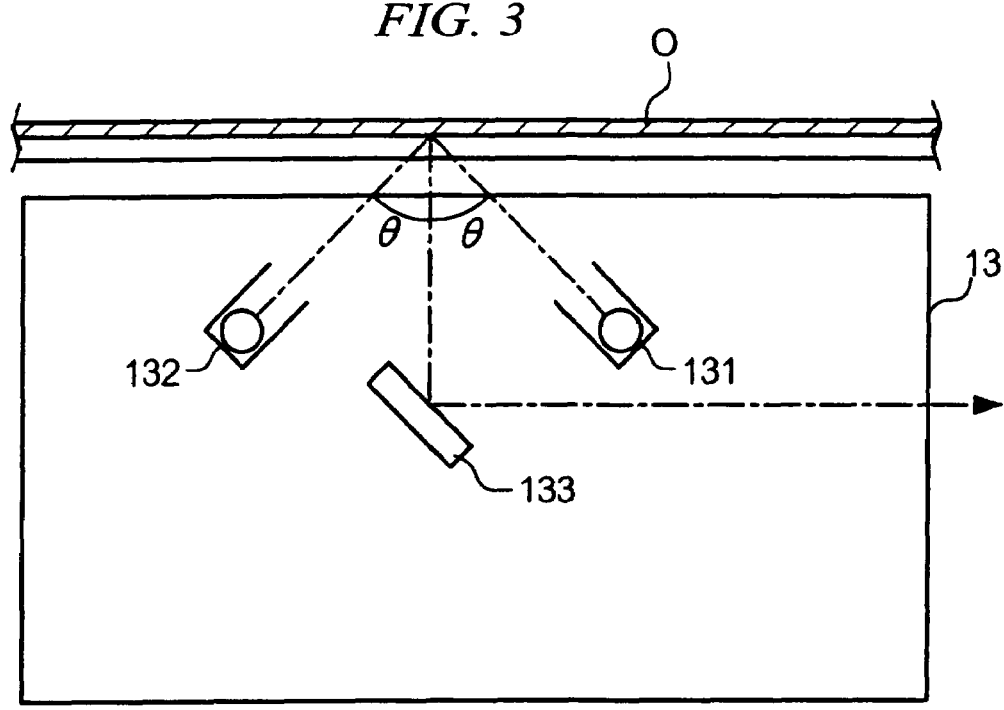
FIG. 3 depicts a structure of a full-rate carriage in the first embodiment.

FIG. 3 specifically shows the structure of the full-rate carriage 13. As shown in FIG. 3, the full rate carriage 13 has a first light source 131, second light source 132, and a mirror 133. The first light source 131 emits first irradiating light having a spectral energy distribution. The second light source 132 emits second irradiating light having a different spectral energy distribution from that of the first irradiating light. More specifically, the first light source 131 emits standard light $D_{65}$ and the second light source 132 emits standard light A.

Figure 4:
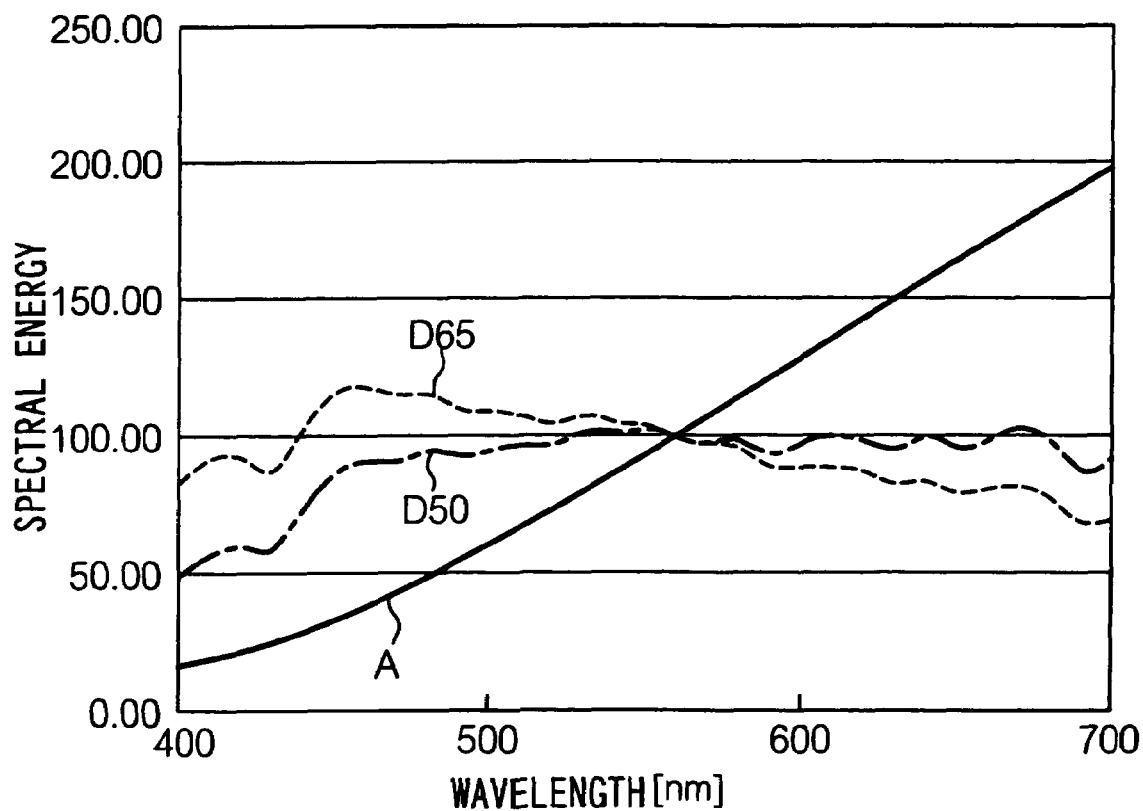
FIG. 4 shows spectral energy distributions of different kinds of light sources.

FIG. 4 shows spectral energy distributions of different kinds of light sources. The light $D_{65}$ approximates to a light source condition of color temperature 6500K (Kelvin) according to JIS (Japanese Industrial Standards) and is similar to artificial daylight or natural light avoiding direct sunlight. As shown in the figure, the light $D_{65}$ has a spectral energy distribution which is approximately uniform throughout a range of about 400 to 700 nm and is also approximately uniform throughout a visible light range of about 380 to 780 nm. Therefore, the light $D_{65}$ is known as light commonly used for color evaluation. In the first embodiment, a xenon lamp is used as a light source approximate to the light $D_{65}$. The light A is from a light source having a color temperature 2856K. As the wavelength increases within the visible light range, the spectral energy of this light increases linearly. In the first embodiment, a tungsten lamp is used as a light source for light A.

As shown in FIG. 3, the first light source 131 and second light source 132 irradiate the object O to be imaged with light at a predetermined incident angle (e.g., 45°) with a predetermined intensity. The mirror 133 forms a light path (one dot chain line) along which light reflected from the object O to be imaged is further reflected and guided to the half-rate carriage 14. The full-rate carriage 13 moves in a direction of arrow A or B shown in FIG. 2 and scans the whole surface of the object O to be imaged, irradiating the object with light.

Referring again to FIG. 2, the half-rate carriage 14 has mirrors 141 and 142 and forms a light path to guide light from the full rate carriage 13 to the imaging lens 15. The half-rate carriage 14 is driven by a drive mechanism (not shown), so as to move at half the speed of the full-rate carriage 13 in the same direction as the carriage 13 during scanning.

Figure 5:
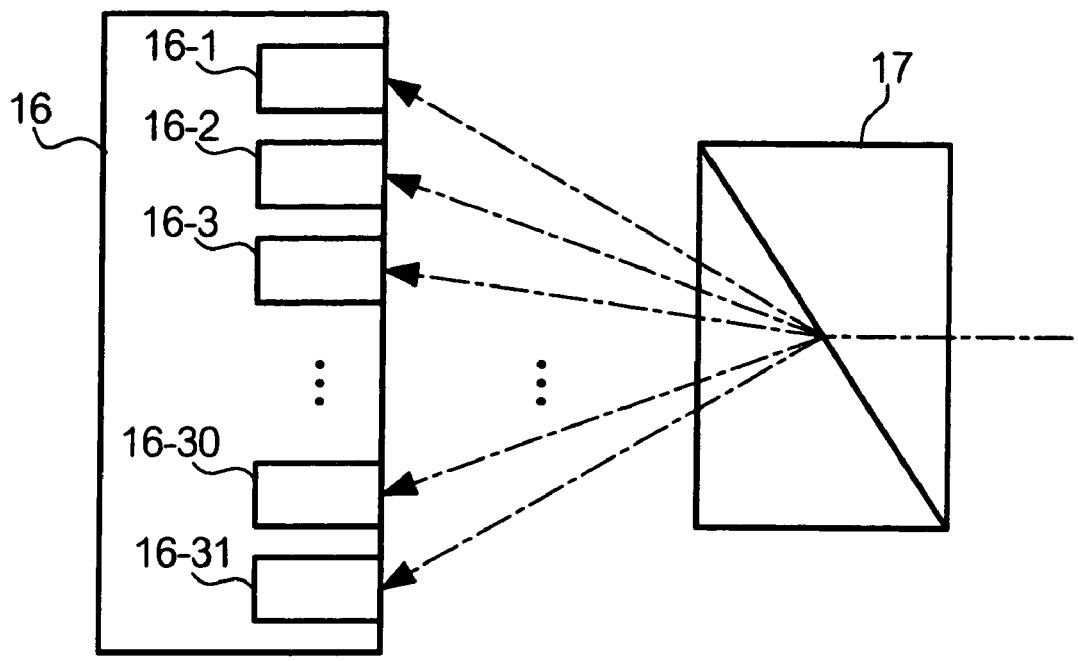
FIG. 5 depicts a structure including a prism and a line sensor in the first embodiment.

The imaging lens 15 and a prism 17 are provided on a light path connecting the mirror 142 and the line sensor 16, and images light reflected from the object O to be imaged at the position of the line sensor 16. FIG. 5 specifically shows a structure including the prism 17 and the line sensor 16. The line sensor 16 has thirty one columns of light receiving elements, e.g., light receiving element columns 16-1, 16-2, 16-3, . . . , 16-31. When reflection light reflected from an area of the object O to be imaged reaches the position of the prism 17, the reflection light is subjected to spectral separation by the prism 17. In this case, light belonging to a visible light range of 400 to 700 nm is spectrally separated into spectrums at wavelength intervals of 10 nm. As a result, as indicated by arrows of broken lines in the figure, the reflection light from the object to be imaged is spectrally separated into a total of thirty one wavelength ranges, e.g., 400 to 410 nm, 410 to 420 nm, 420 to 430 nm, . . . , 680 to 690 nm, and 690 to 700 nm. Meanwhile, the line sensor 16 has also a total of thirty one light receiving element columns 16-1, 16-2, 16-3, . . . , 16-30, and 16-31 whose detection sensitivities are adjusted to match the thirty one wavelength ranges, respectively. Thus, light spectrums of the wavelength ranges separated by the prism 17 are respectively entered into the light receiving element columns 16-1, 16-2, 16-3, . . . , 16-30, and 16-31. The light receiving element columns then detect intensities of the light spectrums, respectively, and generate image signals corresponding to the intensities. The image signals are supplied to the image processing unit 50.

Referring again to FIG. 2, the image forming unit 20 has plural sheet feed trays 21, plural conveyor rolls 22, primary transfer units 23a, 23b, and 23c, an intermediate transfer belt 24, a secondary transfer roll 25, a backup roll 26, a primary fixing mechanism 27, a switching mechanism 28, and a secondary fixing mechanism 29

Each of sheet feed trays 21 contain sheets of a predetermined size and feed the sheets along with image formation. In this case, the sheets are paper sheets normally used for image formation, such as PPC (Plain Paper Copier) sheets. If necessary, paper sheets coated with resins or the like or sheets made of material other than paper may be used. The conveyor rolls 22 for a conveyor path for conveying sheets fed from the sheet feed trays 21 to a position where the secondary transfer roll 25 faces the backup roll 26. The conveyor path for sheets is drawn by a broken line in FIG. 2. The primary transfer units 23a, 23b, and 23c form toner images according to supplied image data and transfer the toner images to the intermediate transfer belt 24.

Figure 6:
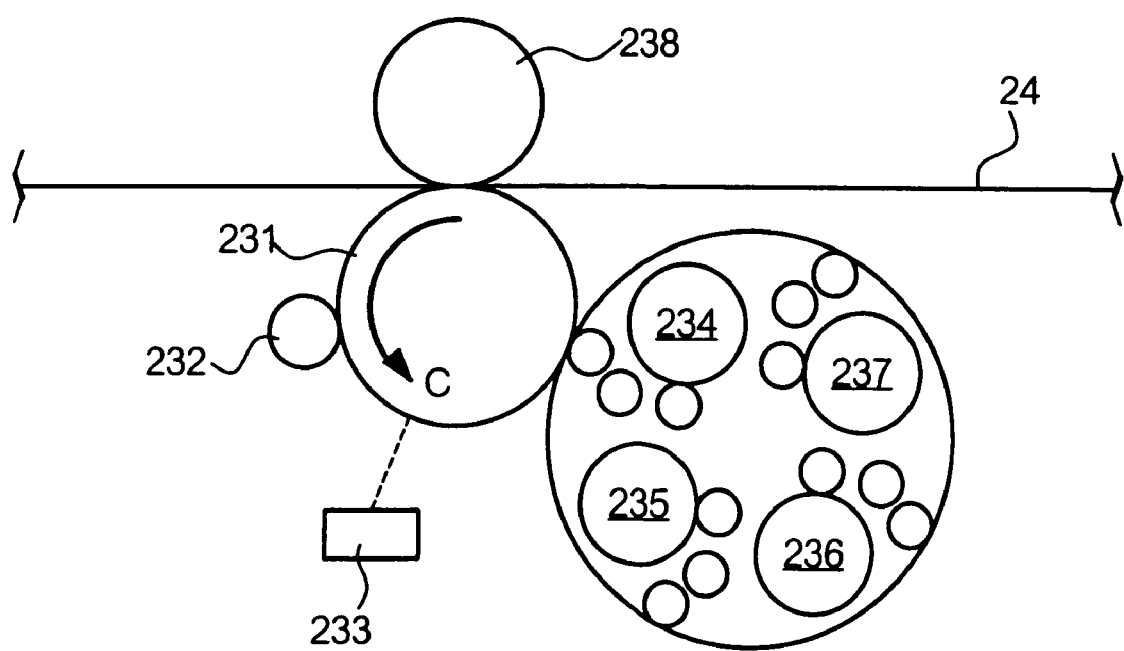
FIG. 6 depicts a structure of a developing mechanism according to the first embodiment.

Referring to FIG. 6, the structure of the primary transfer units 23a and 23b will now be described in detail. Although the primary transfer units 23a and 23b use respectively different toners, the units 23a and 23b have the same structure. In the following description of these componental elements, appendices "a" and "b" to the reference numeral "23" will be omitted. The primary transfer unit 23 includes a photosensitive drum 231, electric charger 232, exposure device 233, developing units 234, 235, 236, and 237, and a primary transfer roll 238. The photosensitive drum 231 is an image carrier on which a photoconductive layer made of organic photoconductive material is formed as an electric charge acceptor. The photosensitive drum 231 is rotated in the direction of arrow C in the figure. The electric charger 232 has a charge roller and electrically charges the surface of the photosensitive drum 231 uniformly. The exposure device 233 irradiates the surface of the photosensitive drum 231 with light using a laser diode, to form an electrostatic latent image having a predetermined electric potential on the surface of the photosensitive drum 231. The developing units 234, 235, 236, and 237 each generate a predetermined potential difference (developing bias) to the surface of the photosensitive drum 231. The potential difference causes a toner to stick to the electrostatic latent image formed on the photosensitive drum 231, to form a toner image. The developing units 234 to 237 constitute a developing device of a so-called rotary type. The primary transfer roll 238 generates a predetermined potential difference (primary transfer bias) at the position where the intermediate transfer belt 24 faces the photosensitive drum 231. The toner image is transferred to the surface of the intermediate transfer belt 24 by the potential difference. The primary transfer unit 23c is a developing unit for one single color. Though the number of types of toners contained in the primary transfer unit 23c differs from those in the primary transfer units 23a and 23b, the primary transfer unit 23c operates substantially in the same manner as the units 23a and 23b. Therefore, an operation of the primary transfer units 23a and 23b will be omitted from the description below.

The image forming unit 20 uses toners of total nine colors for development, which include four primary colors of cyan, magenta, yellow and black, as well as red, orange, green, and blue (toners for the eight colors noted are referred to as "color toners"), and still further a transparent color (a toner for the transparent color is referred to as a "transparent toner"). The transparent toner contains no coloring material and includes a low-molecular-weight polyester resin externally added with $SiO_2$ (silicon dioxide), $TiO_2$ (titanium dioxide), or the like. A toner image consisting of the transparent toner is formed over an entire image to reduce gaps which are caused by a difference in toner amount at every position on the image. Accordingly, surface roughness of the image becomes inconspicuous. Toners as described above are contained at appropriate positions in the primary transfer units 23a, 23b, and 23c, depending on use frequencies. However, only the transparent toner should desirably be transferred prior to color toners. This is because the transparent toner is transferred so as to cover color toners on the surface of each sheet.

Referring again to FIG. 2, other componental elements of the image forming unit 20 will now be described. The intermediate transfer belt 24 is an endless belt member which is moved in the direction of arrow D in the figure by a drive mechanism not shown. To the intermediate transfer belt 24, toner images are transferred (by primary transfer process) at positions where the belt faces the photosensitive drums 231a, 231b, and 231c. The intermediate transfer belt 24 further transfers (by secondary transfer process) the toner images to a sheet. The secondary transfer roll 25 and the backup roll 26 generates a predetermined potential difference (a secondary transfer bias) at a position where the intermediate transfer belt 24 faces the sheet, thereby to transfer the toner images to the sheet. The primary fixing mechanism 27 fixes toner images transferred to the surface of the sheet. The switching mechanism 28 varies the path for conveying the sheet, depending on types of toner images formed on the surface of the sheet. Specifically, the switching mechanism 28 controls the sheet to be conveyed in a direction of arrow R in the FIG. 1f the toner image is of a type including the transparent toner. In case of toner images of the other type, i.e., if including no transparent toner, the sheet is conveyed in a direction of arrow L in the figure and discharged outside.

The secondary transfer mechanism 29 has a fixing belt 291, heater 292, and heat sink 293. In the secondary transfer mechanism 29, the heater 292 further heats a sheet which has once been heated and pressed for fixing by the primary fixing mechanism 27. Toners are thereby changed into a molten state. The secondary transfer mechanism 29 then cools the sheet by the heat sink 293 to fix toners, maintaining the sheet in contact with the fixing belt 291 having a smooth surface. Through this fixing process, toner images may be formed with flat and smooth surfaces and with high glossiness.

Outline of the image forming process will now be described.

The full-rate carriage 13 in the image forming unit 20 scans an object O to be imaged by irradiating the object with light from the first light source 131 or the second light source 132 (this process will be hereinafter referred to as a "scanning operation"). In particular, a scanning operation using the first light source 131 to irradiate the object O is referred to as a "first scanning operation", and image data to be generated therefrom is referred to as "first image data". Another scanning operation using the second light source 132 to irradiate the object O is referred to as a "second scanning operation", and image data to be generated therefrom is referred to as "second image data". That is, the image reading unit 10 carries out two of the first and second scanning operations. The image processing unit 50 generates the first and second data from image signals obtained by the scanning operations, respectively, and calculate spectral reflectances.

In an image forming device according to a related art, spectral reflectances are not treated as continuous values but treated as discrete values. That is, a predetermined number of spectral reflectances are calculated (or extracted) from wavelength ranges which are included in a visible light range and used actually for process of image forming and the like. Hereinafter, a "spectral reflectance estimation function" refers to a function (a continuous value) for obtaining an estimated value by performing regression analysis or the like on "spectral reflectances" (discrete values) extracted from particular wavelength ranges.

If spectral reflectances are regarded as being of a continuous value as is originally meant, the continuous value draws a curve along which the value varies smoothly. In many cases where spectral reflectances are extracted as discrete values, a spectral reflectance estimation function may be obtained with satisfactory accuracy by supposing a wavelength interval $\delta=10$ nm. If the wavelength interval $\delta=10$ nm is set and if a wavelength range from which spectral reflectances should be extracted is set to 400 to 700 nm within a visible light range, thirty one spectral reflectances are extracted per pixel. In case of using an image forming device having a commonly used structure, an object to be imaged is scanned within only three wavelength ranges of R, G, and B, and therefore, only three signals per pixel need to be transferred via signal lines or a bus. If the image forming device with the commonly used structure should extract thirty one spectral reflectances per pixel, a total number of spectral reflectances extracted from an entire image data should be (extracted spectral reflectances per pixel)×(the number of pixels). Consequently, a huge number of values which is about ten times greater than in normal cases with the commonly used structure have to be transferred via signal lines or a bus. Such data transfer requires a prolonged period to merely transfer spectral reflectances as data.

To reduce the amount of data expressing spectral reflectances to be transferred by the image forming device, the amount of data of m spectral reflectances extracted at wavelength intervals 6 has to be reduced. More specifically, m spectral reflectances are expressed by a linear combination of a small number n of eigenvectors than m. That is, if coefficients may be determined for predetermined n eigenvectors, spectral reflectance estimation functions having various characteristics may be uniquely determined. Accordingly, the data amount may be reduced. However, to reduce the data amount in this manner, the number n of eigenvectors should be desirably small. On the other hand, to reduce differences between spectral reflectance estimation functions and original spectral reflectances of an object to be imaged, spectral reflectances having various characteristics need to include eigenvectors whose contributing rates are relatively high.

The following describes in detail why spectral reflectances may be expressed by eigenvectors having relatively high contributing rates. As described above, spectral reflectances are originally continuous amounts. Many of such continuous values are of wavelength ranges in which the continuous values are expressed smoothly as curves in accordance with changes of the wavelength. In other words, spectral reflectances whose wavelength ranges are close to each other have close values in many cases. This is due to the fact that two light spectrums of close wavelength ranges have similar characteristics. When an object to be imaged is irradiated with such two light spectrums, intensities of the spectrums of reflection light reflected from the object have also close characteristics. Therefore, a spectral reflectance of a wavelength range may be considered to be correlative to a spectral reflectance of another wavelength range, and may also be considered to accompany existence of a eigenvector having a relatively large contributing rate. Accordingly, an equation of a spectral reflectance estimation function by use of a eigenvector may be an effective measure to reduce a data amount.

There will be further be described a procedure for calculating a spectral reflectance estimation function by use of a eigenvector as described above.

A manner of defining a eigenvector will now be described. At first, a population is defined by spectral reflectances for a huge number of colors which are supposed to be included in an object to be imaged. Further, a multivariate analysis (e.g., principal content analysis is adopted in the following) is carried out on the population, to define a eigenvector. Since a spectral reflectance estimation function may be expressed, for every color, by using a linear combination of eigenvectors, the population should desirably include spectral reflectances for as many colors as possible, which do not have close spectral reflection characteristics.

Figure 7:
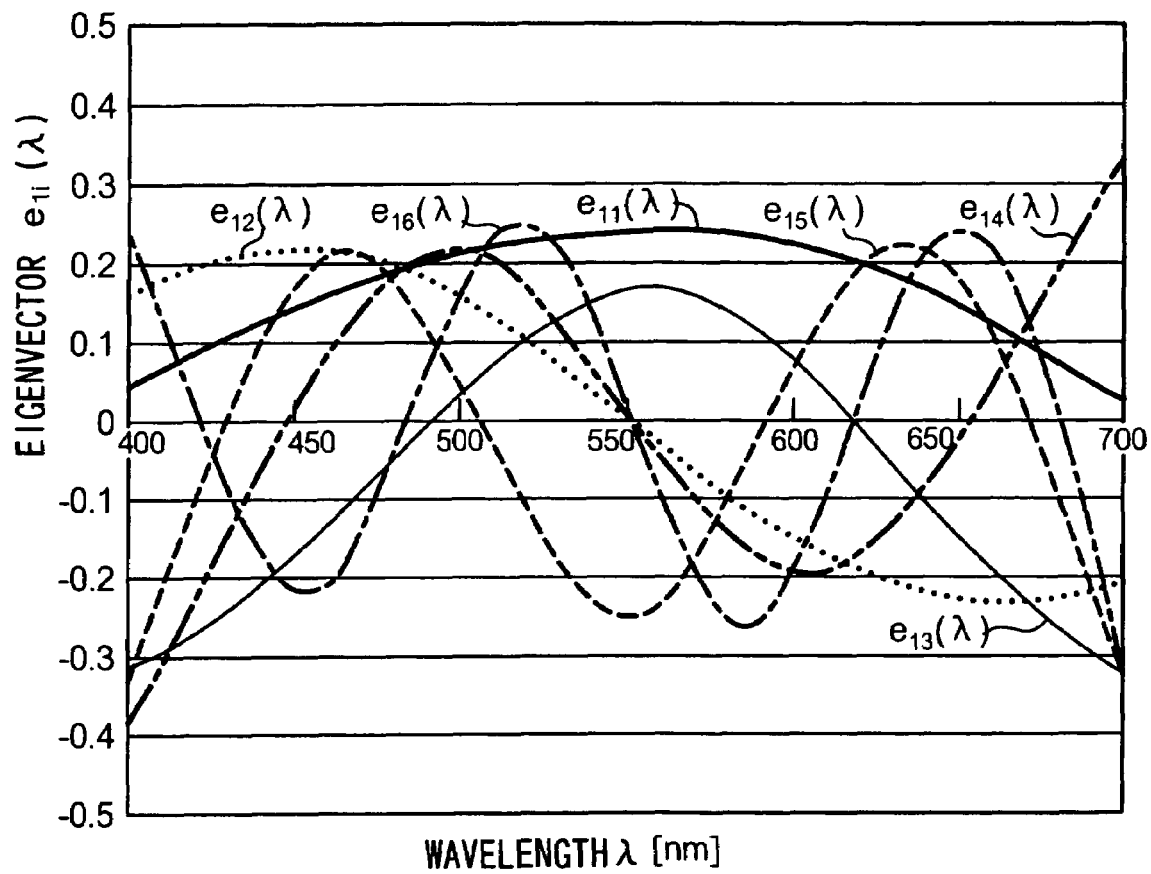
FIG. 7 shows eigenvectors according to the first embodiment.

Next, eigenvectors are defined as principal content analysis is performed on the population. FIG. 7 shows eigenvectors defined from a population Σ. In the figure, the horizontal axis represents a wavelength λ, and values of six eigenvectors $e_{1i}(\lambda)$ relative to the wavelength λ (where i=1 to 6) are represented along the vertical axis.

A spectral reflectance estimation function expressed by linear combination of the eigenvector $e_{1i}(\lambda)$ is expressed as $\rho_1(\lambda)$. The eigenvector $e_{1i}(\lambda)$ has a characteristic which varies as the calculation method of the principal content analysis varies.

Figure 8:
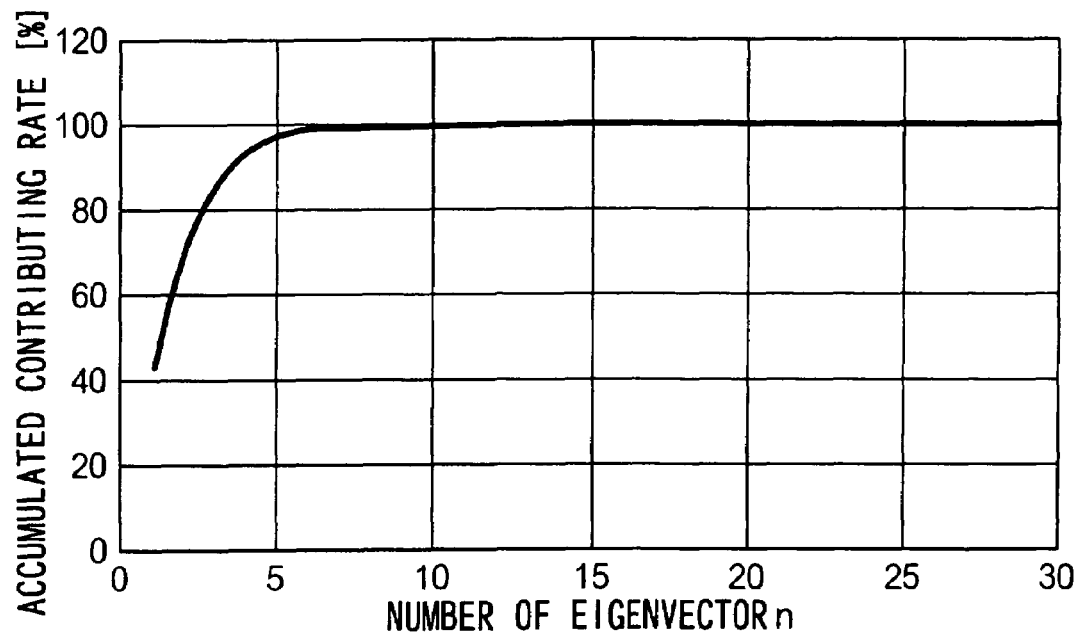
FIG. 8 shows a relationship between the number of eigenvectors and an accumulated contributing rate.

Though FIG. 7 shows six eigenvectors $e_{11}(\lambda)$ to $e_{16}(\lambda)$, the number of eigenvectors is not limited to six. FIG. 8 shows a relationship between the number n of eigenvectors and an accumulated contributing rate relative to the population Σ. As may be seen from FIG. 8, the accumulated contributing rate relative to the population Σ of eigenvectors increases as the number n of eigenvectors increases. Therefore, it may be considered that the number n should desirably be as great as possible, in view of estimation accuracy alone. However, as the number of eigenvectors increases, processing to be performed by the device becomes more complex, and the time required for the processing is extended. A realistic approach is to determine in advance a number which is sufficient to calculate a spectral reflectance with a certain degree of accuracy. In case of the figures, the accumulated contributing rate is about 98% where the number n of the eigenvectors is n=6. This value allows spectral reflectances constituting the population Σ to be expressed with satisfactory accuracy where a spectral reflectance is obtained based on eigenvectors $e_{11}(\lambda)$ to $e_{16}(\lambda)$. Furthermore, if a spectral reflectance of a color having a small color difference from a spectral reflectance not included in the population Σ, these spectral reflectances have close characteristics. Accordingly, a spectral reflectance estimation function may be calculated by interpolation even for a spectral reflectance not included in the population Σ.

In view of the accumulated contributing rate when the number of eigenvectors is seven or higher, the accumulated contributing rate does not substantially increase but stays flat. That is, if the number n of the eigenvectors exceeds a certain value, only the data amount increases and the accuracy of the spectral reflectance estimation function does not substantially improve. On the other hand, if the number of eigenvectors is five or smaller, the data amount of the spectral reflectance estimation function decreases further. However, in this case, the accumulated contributing rate relative to the population Σ drops sharply. For example, if the number of eigenvectors is set to two, the accumulated contributing rate relative to the population Σ is about 60%. With this rate, the spectral reflectance estimation functions cannot attain satisfactory accuracy even for spectral reflectances constituting the population Σ. Therefore, the number of eigenvectors should desirably be selected balancing the accumulated contributing rate relative to a defined population of eigenvectors and a data amount required for the accumulated contributing rate.

Subsequently, a relationship between the eigenvectors $e_{11}(\lambda)$ to $e_{16}(\lambda)$ and the spectral reflectance estimation function $\rho_1(\lambda)$ is expressed by a relation equation 1 below. In the following, thirty one spectral reflectances (m=31) at a wavelength interval δ=10 nm within a wavelength range of 400 to 700 nm are extracted from each of the pixels constituting first and second image data.

$$p_1(\lambda) = \sum_{i=1}^{6} w_{1i} e_{1i}(\lambda) \qquad (1)$$

The equation 1 is to calculate the spectral reflectance estimation function $\rho_1(\lambda)$ by linearly combining the eigenvectors $e_{11}(\lambda)$ to $e_{16}(\lambda)$ with coefficients $w_{11}$ to $w_{16}$. The coefficients $w_{11}$ to $w_{16}$ are unknown values.

Further, color values corresponding to the spectral reflectances obtained from the first and second image data. Optimal coefficients $w_{11}$ to $w_{16}$ are calculated on the basis of a relationship between the color values and the spectral reflectances estimation function $\rho_1(\lambda)$ represented by the equation 1. Provided that the color values are stimulus values on XYZ color coordinates, the coefficients $w_{11}$ to $w_{16}$ are calculated uniquely by the following equations 2 to 7. The equations 2 to 7 are known as relation equations between spectral reflectances and stimulus values on the XYZ color coordinates, and the spectral reflectance estimation function $\rho_1(\lambda)$ is used in this case. The equations 2 to 4 relate to an example of standard light D65, and equations 5 to 7 relate to an example of standard light A.

$$X_{D65} = \sum_{i=1}^{6} w_{1i} \int_{vis-} e_{1i}(\lambda) \cdot E_{65}(\lambda) \cdot \bar{x}(\lambda) d\lambda \quad (2)$$

$$Y_{D65} = \sum_{i=1}^{6} w_{1i} \int_{vis-} e_{1i}(\lambda) \cdot E_{65}(\lambda) \cdot \bar{y}(\lambda) d\lambda \quad (3)$$

$$Z_{D65} = \sum_{i=1}^{6} w_{1i} \int_{vis-} e_{1i}(\lambda) \cdot E_{65}(\lambda) \cdot \bar{z}(\lambda) d\lambda \quad (4)$$

$$X_A = \sum_{i=1}^{6} w_{1i} \int_{vis-} e_{1i}(\lambda) \cdot E_A(\lambda) \cdot \bar{x}(\lambda) d\lambda \quad (5)$$

$$Y_A = \sum_{i=1}^{6} w_{1i} \int_{vis-} e_{1i}(\lambda) \cdot E_A(\lambda) \cdot \bar{y}(\lambda) d\lambda \quad (6)$$

$$Z_A = \sum_{i=1}^{6} w_{1i} \int_{vis-} e_{1i}(\lambda) \cdot E_A(\lambda) \cdot \bar{z}(\lambda) d\lambda \quad (7)$$

In the equations 2 to 7, "vis-" denotes a wavelength range within a visible light range, from which spectral reflectances are extracted, e.g., 400 to 700 nm in the first embodiment. $E_{65}(\lambda)$ is an equation indicative of a spectral energy distribution of light from the first light source 131. $E_A(\lambda)$ is an equation indicative of a spectral energy distribution of light from the second light source 132. Functions expressed with overbars added to x, y, and z of $x(\lambda)$, $y(\lambda)$, and $z(\lambda)$ are respectively color-matching functions about x-axis, y-axis, and z-axis on the XYZ color coordinates.

Thirty one spectral reflectances are extracted from each of the pixels forming the first and second image data. For each of the spectral reflectances, stimulus values $X_{D65}$, $Y_{D65}$, $Z_{D65}$, $X_A$, $Y_A$, and $Z_A$ are obtained. The equations 2 to 7 are then simplified into first-degree equations with six coefficients $w_{11}$ to $w_{16}$ as unknown values, respectively. Accordingly, a unique value is calculated for each of the coefficients $w_{11}$ to $w_{16}$. After the values of the coefficients $w_{11}$ to $w_{16}$ are calculated, the image forming device 1 may obtain the spectral reflectance estimation function $\rho_1(\lambda)$ and may determine colors and amounts of toners which are required when forming an image. Since the stimulus values $X_{D65}$, $Y_{D65}$, $Z_{D65}$, $X_A$, $Y_A$, and $Z_A$ have already been obtained, the user may roughly estimate colors from the stimulus values.

Figure 9:
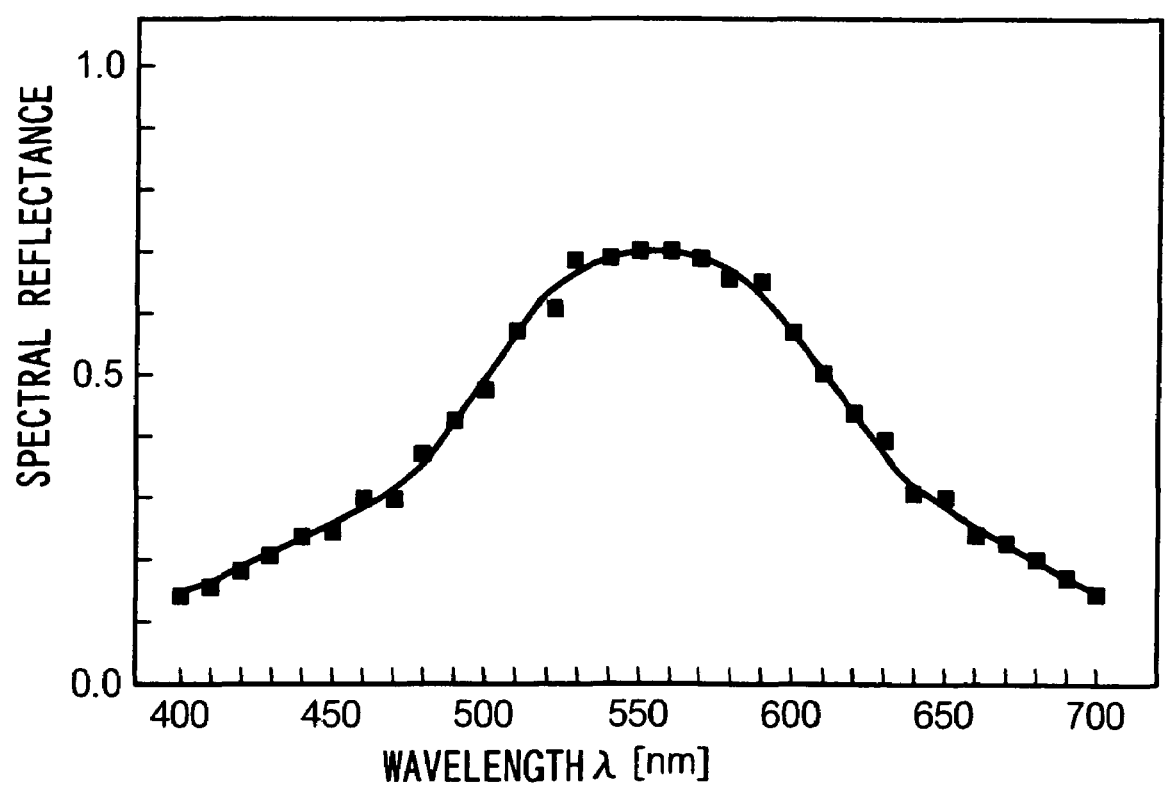
FIG. 9 shows an example of a spectral reflectance estimation function $\rho_1(\lambda)$ according to the first embodiment.

FIG. 9 shows exemplary spectral reflectances extracted from image data representing an object to be imaged, and a spectral reflectance estimation function $\rho_1(\lambda)$ expressed by the eigenvectors $e_{11}(\lambda)$ to $e_{16}(\lambda)$. In the figure, rectangular dots denote thirty one spectral reflectances (discrete values) extracted supposing the wavelength interval to be $\delta=10$ nm. A solid curve represents the spectral reflectance estimation function $\rho_1(\lambda)$ (as a continuous amount) which plots the spectral reflectances by using six eigenvectors $e_{11}(\lambda)$ to $e_{16}(\lambda)$. As graphically shown in this figure, the spectral reflectance estimation function $\rho_1(\lambda)$ draws a function curve which smoothly changes. This curve roughly agrees with original spectral reflectances of the object to be imaged.

Next, a specific operation procedure to be carried out by the image forming device 1 will be described. In a manufacturing phase, to define six eigenvectors $e_{11}(\lambda)$ to $e_{16}(\lambda)$ in advance, principal content analysis is carried out manually or by the image forming device 1, on a population $\Sigma$ consisting of spectral reflectances for various colors which may be supposed to be included in an object to be imaged. The defined eigenvectors $e_{11}(\lambda)$ to $e_{16}(\lambda)$ are stored in an internal memory in the image processing unit 50 or the like.

Figure 10:
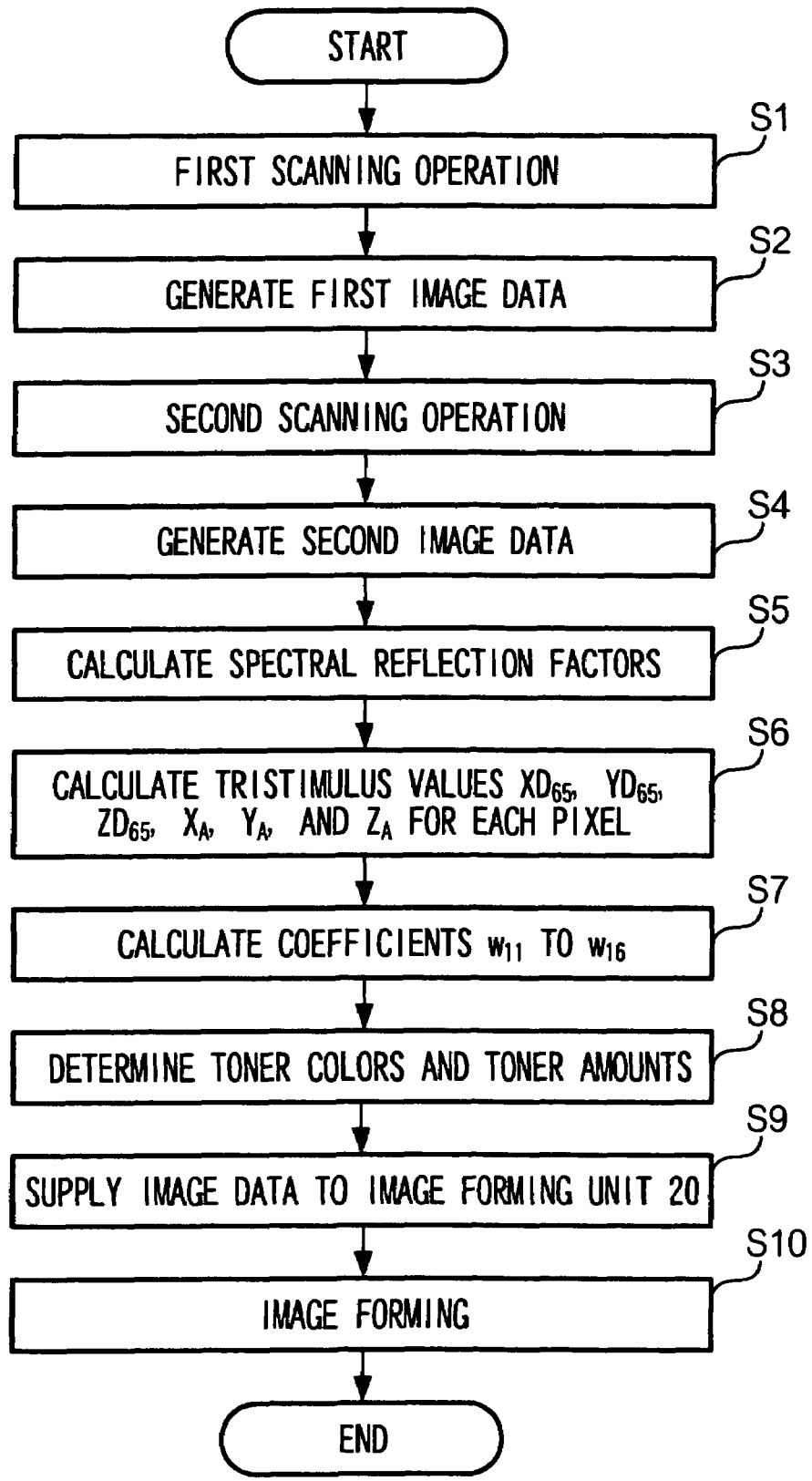
FIG. 10 is a flowchart showing an operation procedure of the image forming device according to the first embodiment.

FIG. 10 is a flowchart showing an operation procedure of an image formed on a recording sheet P after a scanning operation is performed on an object O to be imaged.

According to FIG. 10, an object O to be imaged is placed on the platen glass 11, and an operator gives an instruction to start image forming. Then, the image reading unit 10 carries out a first scanning operation by irradiating the object O with light from the first light source 131 (step S1). Subsequently, the controller 30 supplies a generated image signal to the image processing unit 50, which generates first image data (step S2). The image reading unit 10 further carries out a second scanning operation by irradiating the object O to be imaged with light from the second light source 132 (step S3). The controller 30 further supplies a generated image signal to the image processing unit 50. The image processing unit 50 generates second image data (step S4). Next, the image processing unit 50 calculates spectral reflectances for each of the pixels constituting the image data (step S5). More specifically, thirty one spectral reflectances are calculated for each pixel, at wavelength intervals of $\delta=10$ nm within a wavelength range of 400 to 700 nm.

Subsequently, the image processing unit 50 calculates $X_{D65}$, $Y_{D65}$, $Z_{D65}$, $X_A$, $Y_A$, and $Z_A$ on the XYZ color coordinates for each of the pixels forming first and second data, based on the spectral reflectances calculated in the step S5 (step S6). Further, the image processing unit 50 calculates the coefficients $w_{11}$ to $w_{16}$ to obtain a spectral reflectance estimation function $\rho_1(\lambda)$ (step S7).

Subsequently, the image processing unit 50 executes a color space processing and a screen processing on image data, and determines colors and amounts of toners to be applied to areas corresponding to respective pixels of the image data (step S8).

When determining toner amounts, the controller 30 specifies mixing ratios between colors of toners (or coloring materials) of cyan, magenta, yellow, black, red, orange, green, and blue and shapes of screen dots for each pixel, depending on the colors expressed by the spectral reflectance estimation function $\rho_1(\lambda)$. The controller 30 may further determine whether or not a transparent toner should be used, depending on an image expressed by the image data. For example, if the image data is a monochrome document data which requires toners of a small number of colors, the controller 30 sets zero as a toner amount of the transparent toner. Otherwise, if the image includes a lot of colors, i.e., if toners of a large number of colors are used, the controller 30 applies a predetermined amount of transparent toner to the entire surface of the image data.

The controller 30 supplies the image forming unit 20 with the image data including information indicative of mixing ratios, area ratios, and screen dots concerning toners of respective colors for each pixel (step S9). Based on the image data, the image forming unit 20 forms an image on a recording sheet P (step S10) using plural toners.

At this time, the image forming unit 20 selects primary transfer units 23 corresponding to image data for respective colors, and forms electrostatic latent images based on the image data. Thereafter, the image forming unit 20 selects developing units to match the toner colors indicated by the image data, and applies toners to the electrostatic latent images, to form toner images. Toner images for respective colors are thus formed and each color is transferred to the intermediate transfer belt 24. The image forming unit 20 further secondarily transfers the toner images to a sheet, and fixes the toner images by the primary fixing mechanism 27 and secondary fixing mechanism 29. The sheet is then discharged outside. In this manner, a copy of an image representing the object O to be imaged is formed, and the image forming process is concluded.

The first embodiment is configured as described above.

A second embodiment of the invention will now be described.

In the second embodiment, the spectral reflectance may be calculated more accurately than in the first embodiment.

Figure 11:
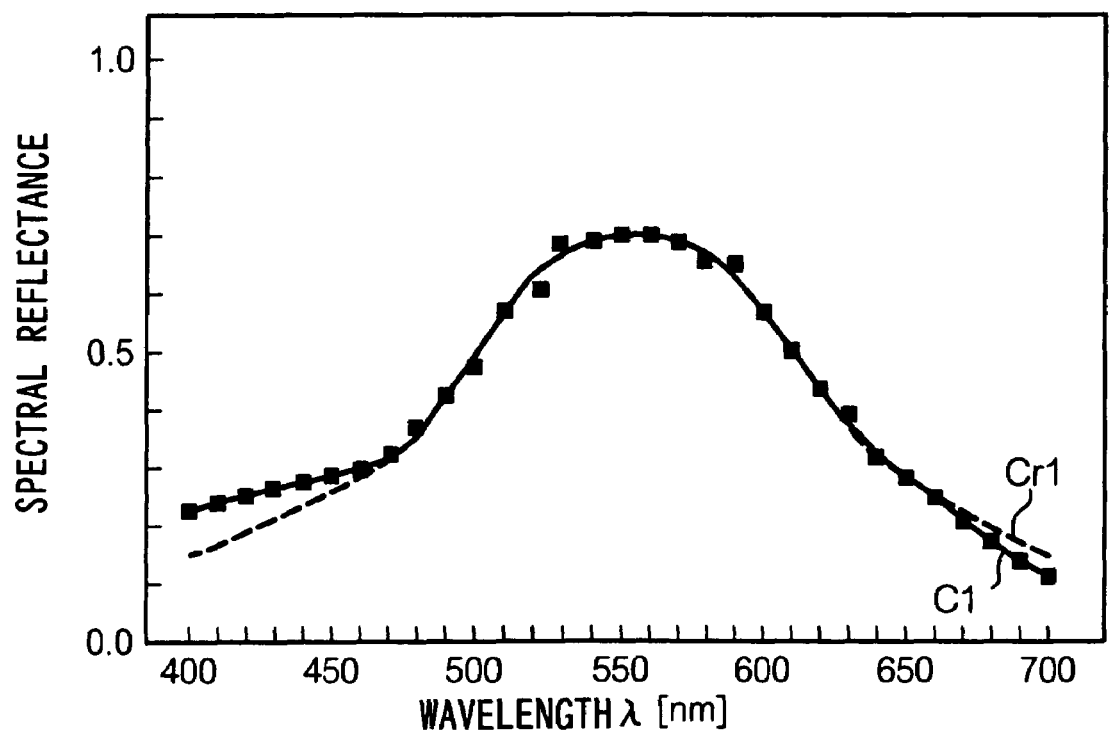
FIG. 11 shows a spectral reflectance estimation function $\rho_1(\lambda)$ calculated by a method according to the first embodiment and original spectral reflectances of an object to be imaged.

In FIG. 11, a solid curve C1 represents a spectral reflectance estimation function $\rho_1(\lambda)$ calculated by a method according to the first embodiment, and a dotted curve Cr1 represents original spectral reflectances of an object to be imaged. As shown in the figure, there are relatively great differences between the calculated spectral reflectance estimation function and the original spectral reflectance of the object to be imaged, within a low wavelength range (about 400 to 440 nm n) and a high wavelength range (about 660 to 700 nm) in a wavelength range from which the spectral reflectances have been extracted.

Figure 12:
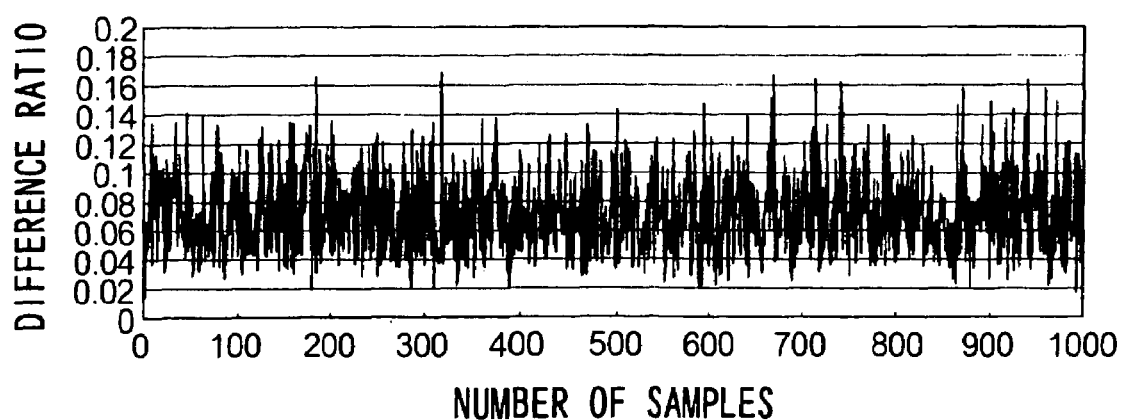
FIG. 12 shows differences between the spectral reflectance estimation function $\rho_1(\lambda)$ and original spectral reflectances for one thousand of various objects to be imaged.
Figure 13:
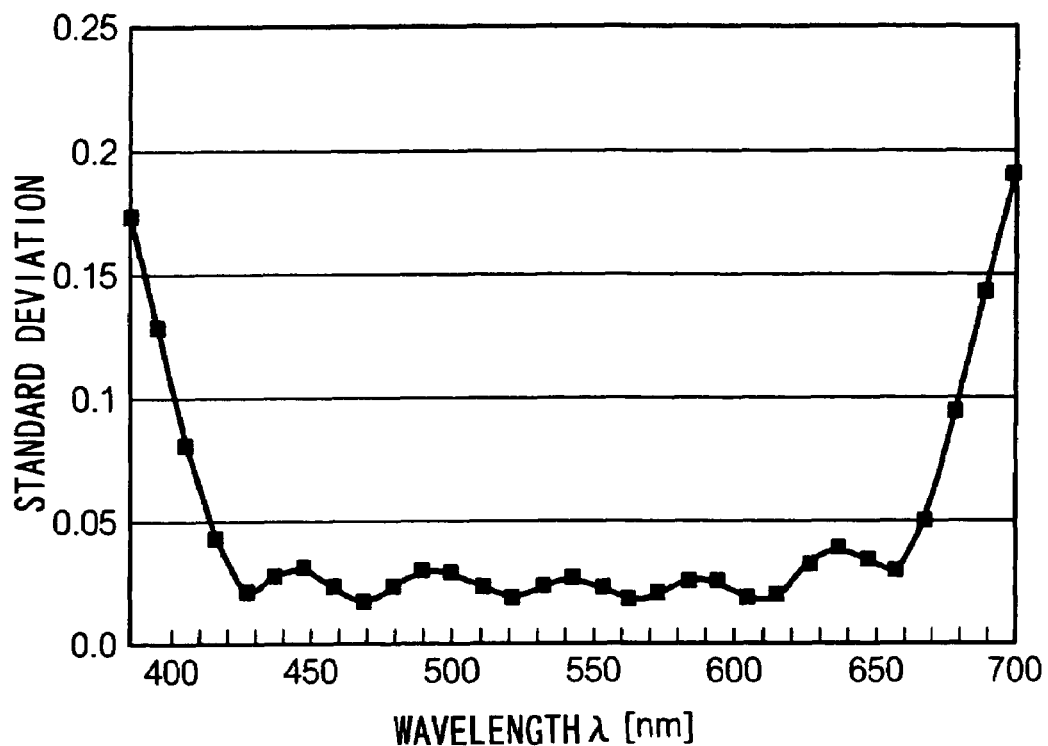
FIG. 13 shows as standard deviations the differences between the spectral reflectance estimation function $\rho_1(\lambda)$ and original spectral reflectances.

FIG. 11 shows an example of a particular object to be imaged. If differences are obtained between a calculated spectral reflectance estimation function $\rho_1(\lambda)$ and original spectral reflectances for one thousand of the various objects to be imaged, differences of approximately 8% exist between the function and the factors, as shown in FIG. 12. In FIG. 12, the horizontal axis represents the number of sampled objects, and the vertical axis represents ratios expressing the differences between the function and the factors. FIG. 13 shows the differences expressed as standard deviations. As may be seen from this figure, differences between a calculated spectral reflectance estimation function and spectral reflectances are large in the low and the high wavelength ranges within the wavelength range from which spectral reflectances have been extracted.

The present inventors have presumed the following reasons why differences between a spectral reflectance estimation function $\rho_1(\lambda)$ and the original spectral reflectances of an object to be imaged are large only within the low and high wavelength ranges.

Figure 14:
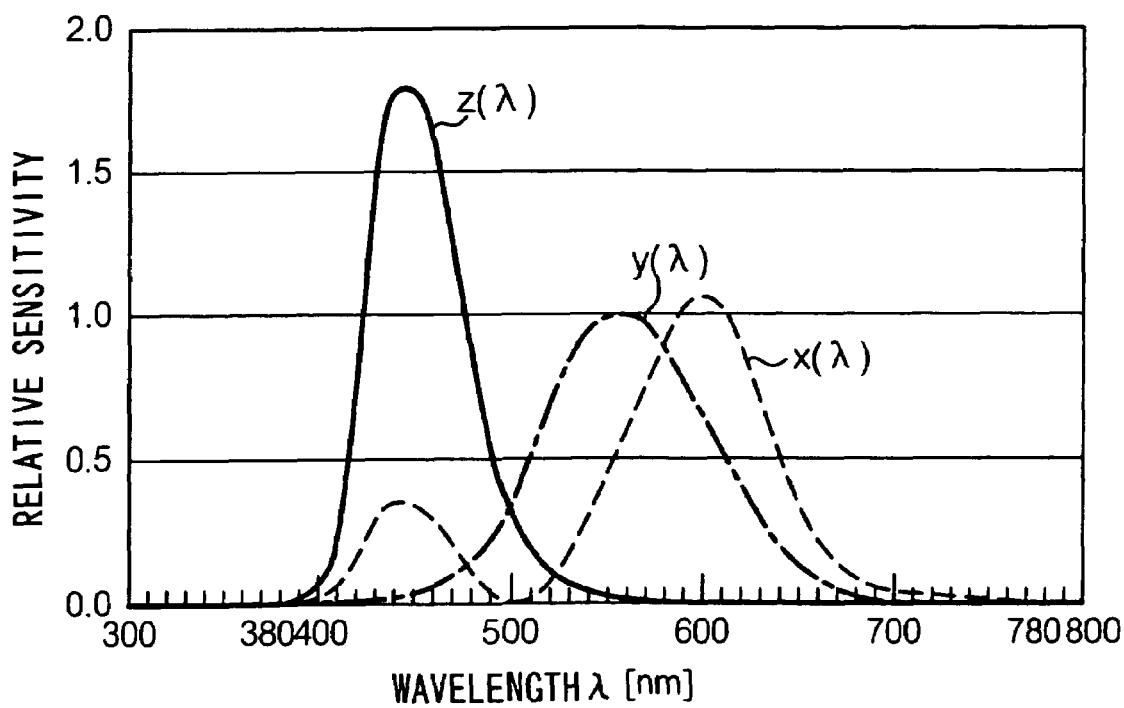
FIG. 14 shows relationships between stimulus values on the XYZ color coordinates and wavelengths.

FIG. 14 shows relationships between wavelengths and stimulus values on the XYZ color coordinates. The horizontal axis represents the wavelength $\lambda$, and the vertical axis represents the stimulus values $x(\lambda)$, $y(\lambda)$, and $z(\lambda)$ relative to the wavelength $\lambda$. The stimulus values $x(\lambda)$, $y(\lambda)$, and $z(\lambda)$ presumably and numerically express what stimuli are made on human eyes, and therefore cover an entire wavelength range of 400 to 700 nm including a wavelength range of visible light, as shown in FIG. 14. However, in the low wavelength range of approximately 400 to 430 nm and in the high wavelength range of approximately 650 to 700 nm (about 660 to 700 nm), the stimulus values $x(\lambda)$, $y(\lambda)$, and $z(\lambda)$ are small. In other words, the stimulus values $x(\lambda)$, $y(\lambda)$, and $z(\lambda)$ contribute to the low and high wavelength ranges at lower rates than the stimulus values $x(\lambda)$, $y(\lambda)$, and $z(\lambda)$ contribute to the other wavelength range (a medium wavelength range). Meanwhile, in case of obtaining a spectral reflectance estimation function $\rho_1(\lambda)$ in accordance with the method described in the first embodiment, this method attempts to reproduce colors (visible to human eyes) of an object to be imaged with high fidelity. However, the contributing rates of the stimulus values $x(\lambda)$, $y(\lambda)$, and $z(\lambda)$ within the low and high wavelength ranges are small in the method of the first embodiment, so that colors (visible to human eyes) of an object to be imaged may be reproduced accurately within the low and the high wavelength ranges. On the other hand, the stimulus values $x(\lambda)$, $y(\lambda)$, and $z(\lambda)$ within the low and the high wavelength ranges are not always accurate.

From the reasons as described above, differences between the spectral reflectance estimation function $\rho_1(\lambda)$ and original spectral reflectances of an object to be imaged increase within the low and high wavelength ranges.

In view of the above, in the second embodiment, spectral reflectances are calculated throughout a substantially entire wavelength range (380 to 780 nm) of the visible light range, which is higher than the wavelength range of 400 to 700 nm used in the actual process of image forming or the like. If a spectral reflectance estimation function is obtained on the basis of the spectral reflectances, only the spectral reflectance estimation function within the medium wavelength range of 400 to 700 nm is used for image forming process or the like, excluding the low wavelength range of 380 to 400 nm and the high wavelength range of 700 to 780 nm from the wavelength range of visible light. In this manner, differences between the spectral reflectance estimation function and the spectral reflectances of an object to be imaged may be considered to decrease within the medium wavelength range.

Such consideration has resulted from the reasons as follows.

As shown in FIG. 14, the stimulus values $x(\lambda)$, $y(\lambda)$, and $z(\lambda)$ actually contribute within the low wavelength range of 380 to 400 nm and the high wavelength range of 700 to 780 nm both included in the visible light range though the contributing rates are low. Such contribution means that, if a spectral reflectance estimation function is obtained, differences between stimulus values $x(\lambda)$, $y(\lambda)$, and $z(\lambda)$ expressing colors (visible to human eyes) of an object to be imaged and original values of colors of the object appear also within the low and high wavelength ranges. However, the differences are so small that the stimulus values $x(\lambda)$, $y(\lambda)$, and $z(\lambda)$ within the low wavelength range of 380 to 400 nm and the high wavelength range of 700 to 780 nm tend to cause the appearance of more conspicuous differences to the original values of the colors of the object.

Figure 15:
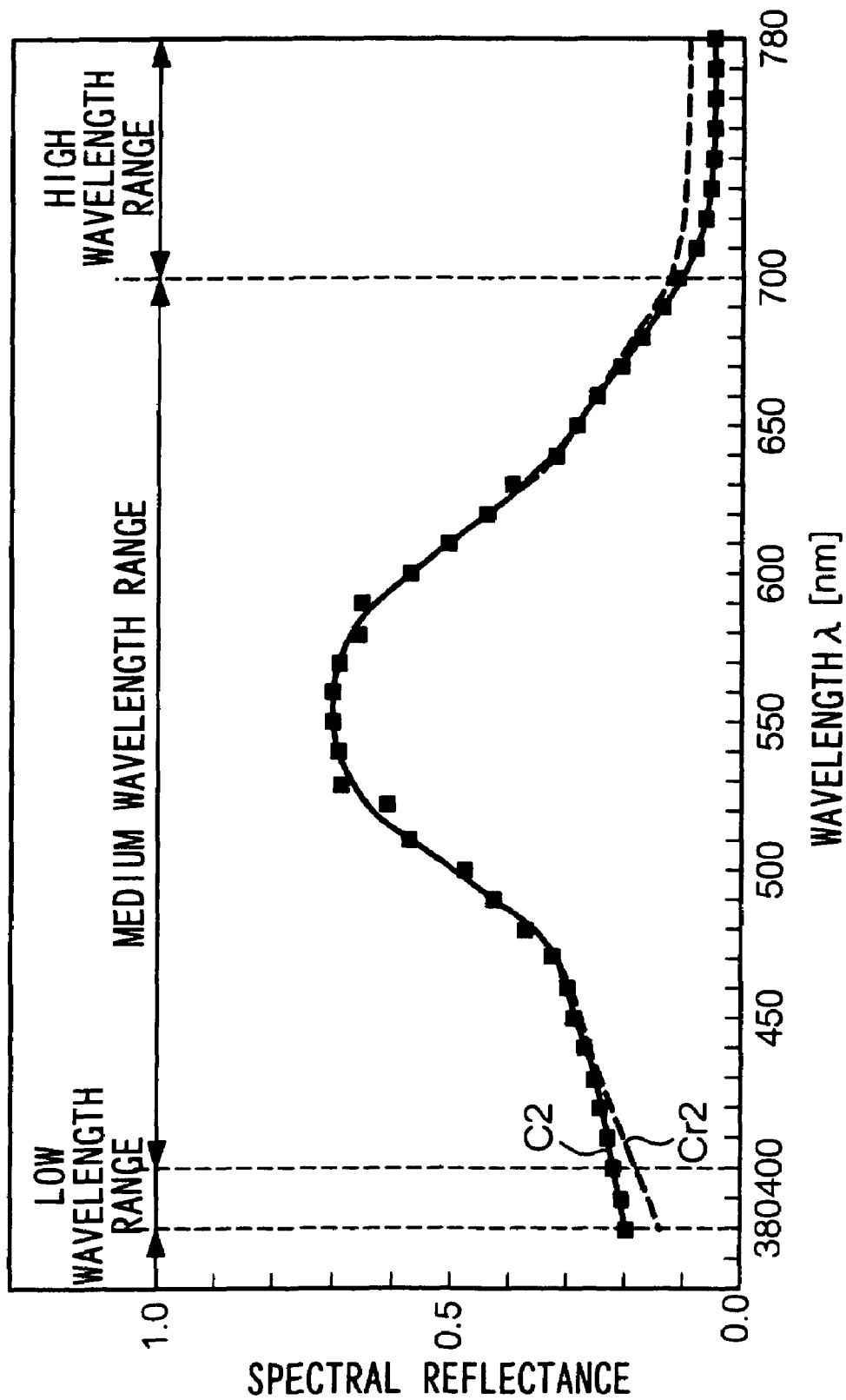
FIG. 15 shows a spectral reflectance estimation function $\rho_2(\lambda)$ calculated by a method according to the second embodiment, and original spectral reflectances of an object to be imaged.

Referring to FIG. 15, the feature described above will be described in more detail A solid curve C2 in FIG. 15 represents a spectral reflectance estimation function obtained by calculating spectral reflectances throughout the substantially entire wavelength range (380 to 780 nm) of the visible light range. A dotted curve Cr2 represents original spectral reflectances of an object to be imaged. As may be understood from a comparison between FIGS. 11 and 15, differences between a spectral reflectance estimation function and original spectral reflectances of an object to be imaged are relatively large within the low wavelength range (380 to 400 nm) and the high wavelength range (700 to 780 nm) in the wavelength range of 380 to 780 nm. In contrast, the differences are very small within the medium wavelength range of 400 to 700 nm. In brief, the differences which occur between the function and the factors are concentrated on the low wavelength range of 380 to 400 nm and the high wavelength range of 700 to 780 nm. As a consequence, the differences are small in the medium wavelength range of 400 to 700 nm. Therefore, stimulus values $x(\lambda)$, $y(\lambda)$, and $z(\lambda)$ are calculated in advance within the wavelength range of 380 to 780 nm. Amounts of coloring materials and the like are calculated using stimulus values x(λ), y(λ), and z(λ) related to a wavelength range defined by excluding the low wavelength range of (380 to 400 nm) and the high wavelength range of (700 to 780 nm) from the wavelength range of 380 to 780 nm. In this manner, the differences between the spectral reflectance estimation function and the original spectral reflectances may be further reduced than in the first embodiment described previously.

Figure 16:
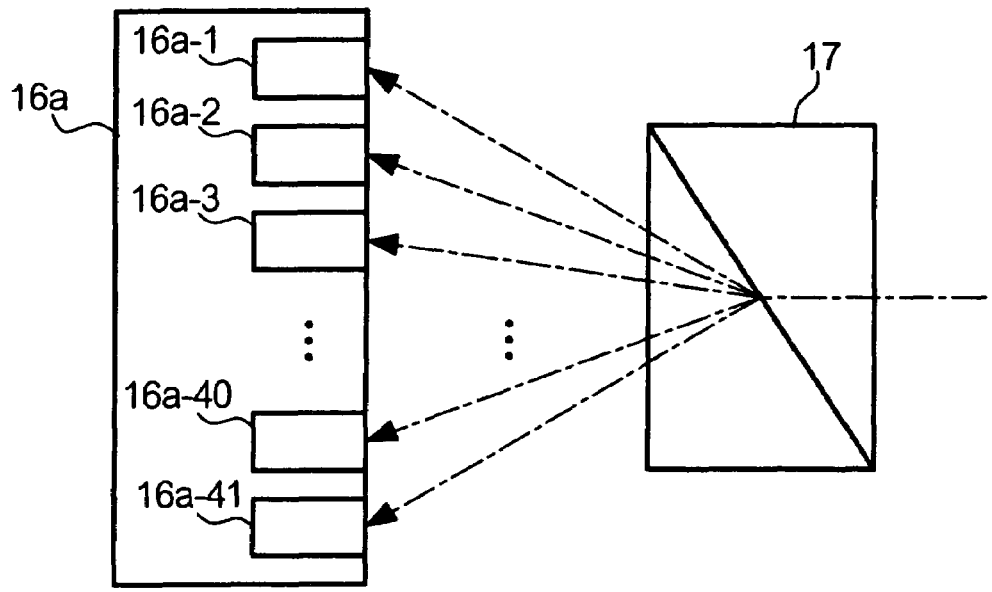
FIG. 16 depicts a structure including a prism and a line sensor according to the second embodiment.

From the reasons described above, the image forming device 1 calculates a spectral reflectance estimation function for 380 to 780 nm, and therefore extracts spectral reflectances in this wavelength range. Accordingly, the second embodiment uses a line sensor 16a in place of the line sensor 16 in the first embodiment. FIG. 16 shows a structure including a prism 17 and the line sensor 16a in more detail. The line sensor 16a has, for example, forty one columns of thirty one columns of light receiving elements, e.g., light receiving element columns 16a-1, 16a-2, 16a-3, . . . , 16a-40, and 16a-41. When reflection light from an area on the object O to be imaged reaches the position of the prism 17, the reflection light is subjected to spectral separation by the prism 17. In this case, light belonging to a visible light range of 380 to 780 nm is spectrally separated into spectrums at wavelength intervals of 10 nm. As a result, as indicated by arrows of broken lines in the figure, the reflection light from the object to be imaged is spectrally separated into a total of forty one wavelength ranges, e.g., 380 to 390 nm, 390 to 400 nm, 400 to 410 nm, . . . , 760 to 770 nm, and 770 to 780 nm. Meanwhile, the line sensor 16a also has a total of forty one light receiving element columns 16a-1, 16a-2, 16a-3, . . . , 16a-40, and 16a-41 whose detection sensitivities are adjusted to match the forty one wavelength ranges, respectively. Thus, light spectrums of the wavelength ranges separated by the prism 17 are respectively entered into the light receiving element columns 16a-1, 16a-2, 16a-3, . . . , 16a-40, and 16a-41. The light receiving element columns then respectively detect intensities of the light spectrums and generate image signals corresponding to the intensities. The image signals are supplied to the image processing unit 50.

Figure 17:
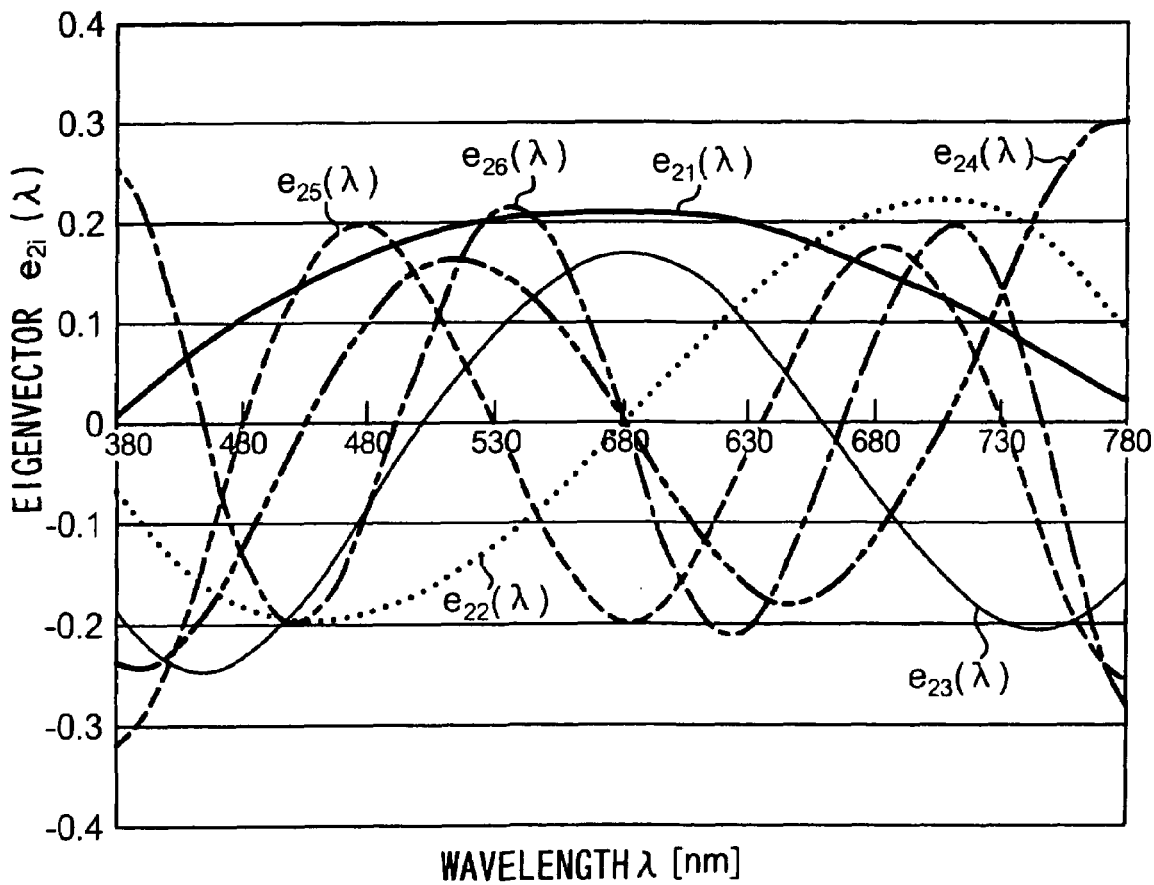
FIG. 17 shows eigenvectors according to the second embodiment.

The manner of defining the eigenvectors is the same as that in the first embodiment except that the target wavelength range is from 380 to 780 nm. FIG. 17 graphically shows eigenvectors defined on the basis of a population Σ according to the second embodiment. In FIG. 17, the horizontal axis represents a wavelength λ, and values of six eigenvectors $e_{2j}(\lambda)$ relative to the wavelength λ (where j=1 to 6) are represented along the vertical axis. A spectral reflectance estimation function expressed by the eigenvector $e_{2j}(\lambda)$ is expressed as $\rho_2(\lambda)$.

Next, a relationship between the eigenvectors $e_{11}(\lambda)$ to $e_{16}(\lambda)$ and the spectral reflectance estimation function $\rho_1(\lambda)$ is expressed by a relation equation 8 below. In the following, forty one spectral reflectances (m=41) at wavelength intervals of δ=10 nm within the wavelength range of 380 to 780 nm are extracted from each of the pixels constituting first and second image data.

$$\rho_2(\lambda) = \sum_{j=1}^{6} w_{2j} e_{2j}(\lambda) \quad (8)$$

The equation 8 is to calculate the spectral reflectance estimation function $\rho_2(\lambda)$ by linearly combining the eigenvectors $e_{21}(\lambda)$ to $e_{26}(\lambda)$ with coefficients $w_{21}$ to $w_{26}$. The coefficients $w_{11}$ to $w_{16}$ are unknown values.

Further, color values are obtained on the basis of spectral reflectances calculated from the first and second image data. Optimal coefficients $w_{21}$ to $w_{26}$ are calculated from a relationship between the color values and the spectral reflectances estimation function represented by the equation 8. Provided that the color values are stimulus values on XYZ color coordinates, the coefficients $w_{21}$ to $w_{26}$ are calculated uniquely by the following equations 9 to 14. The equations 9 to 11 relate to an example of standard light D65, and equations 12 to 14 relate to an example of standard light A.

$$X_{D65} = \sum_{j=1}^{6} w_{2j} \int_{vis} e_{2j}(\lambda) \cdot E_{65}(\lambda) \cdot \bar{x}(\lambda) d\lambda \quad (9)$$

$$Y_{D65} = \sum_{j=1}^{6} w_{2j} \int_{vis} e_{2j}(\lambda) \cdot E_{65}(\lambda) \cdot \bar{y}(\lambda) d\lambda \quad (10)$$

$$Z_{D65} = \sum_{j=1}^{6} w_{2j} \int_{vis} e_{2j}(\lambda) \cdot E_{65}(\lambda) \cdot \bar{z}(\lambda) d\lambda \quad (11)$$

$$X_A = \sum_{j=1}^{6} w_{2j} \int_{vis} e_{2j}(\lambda) \cdot E_A(\lambda) \cdot \bar{x}(\lambda) d\lambda \quad (12)$$

$$Y_A = \sum_{j=1}^{6} w_{2j} \int_{vis} e_{2j}(\lambda) \cdot E_A(\lambda) \cdot \bar{y}(\lambda) d\lambda \quad (13)$$

$$Z_A = \sum_{j=1}^{6} w_{2j} \int_{vis} e_{2j}(\lambda) \cdot E_A(\lambda) \cdot \bar{z}(\lambda) d\lambda \quad (14)$$

The equations 9 to 11 express relationships between stimulus values x(λ), y(λ), and z(λ) obtained by a first scanning operation and values of the spectral reflectance estimation function $\rho_2(\lambda)$. The equations 12 to 14 express relationships between stimulus values x(λ), y(λ), and z(λ) obtained by a second scanning operation and values of the spectral reflectance estimation function $\rho_2(\lambda)$. In the equations 9 to 14, "vis-" denotes a substantial visible light range from which spectral reflectances are extracted, e.g., 380 to 780 nm in this case. Functions expressed with overbars added to x, y, and z of x(λ), y(λ), and z(λ) are respectively color-matching functions about x-axis, y-axis, and z-axis on the XYZ color coordinates.

Forty one spectral reflectances are extracted from each of the pixels forming the first and second image data. For each of the spectral reflectances, stimulus values $X_{D65}$, $Y_{D65}$, $Z_{D65}$, $X_A$, $Y_A$, and $Z_A$ are obtained. The equations 9 to 14 are then simplified into first-degree equations with six coefficients $w_{21}$ to $w_{26}$ as unknown values, respectively. Accordingly, a unique value is calculated for each of the coefficients $w_{21}$ to $w_{26}$.

In this manner, differences between the spectral reflectance estimation function $\rho_2(\lambda)$ and the original spectral reflectances of an object to be imaged are obtained for one thousand of the various objects to be imaged. As a result, the differences between the function and the factors fall within a range of approximately 6% or so which is smaller than in the first embodiment described previously.

Figure 18:
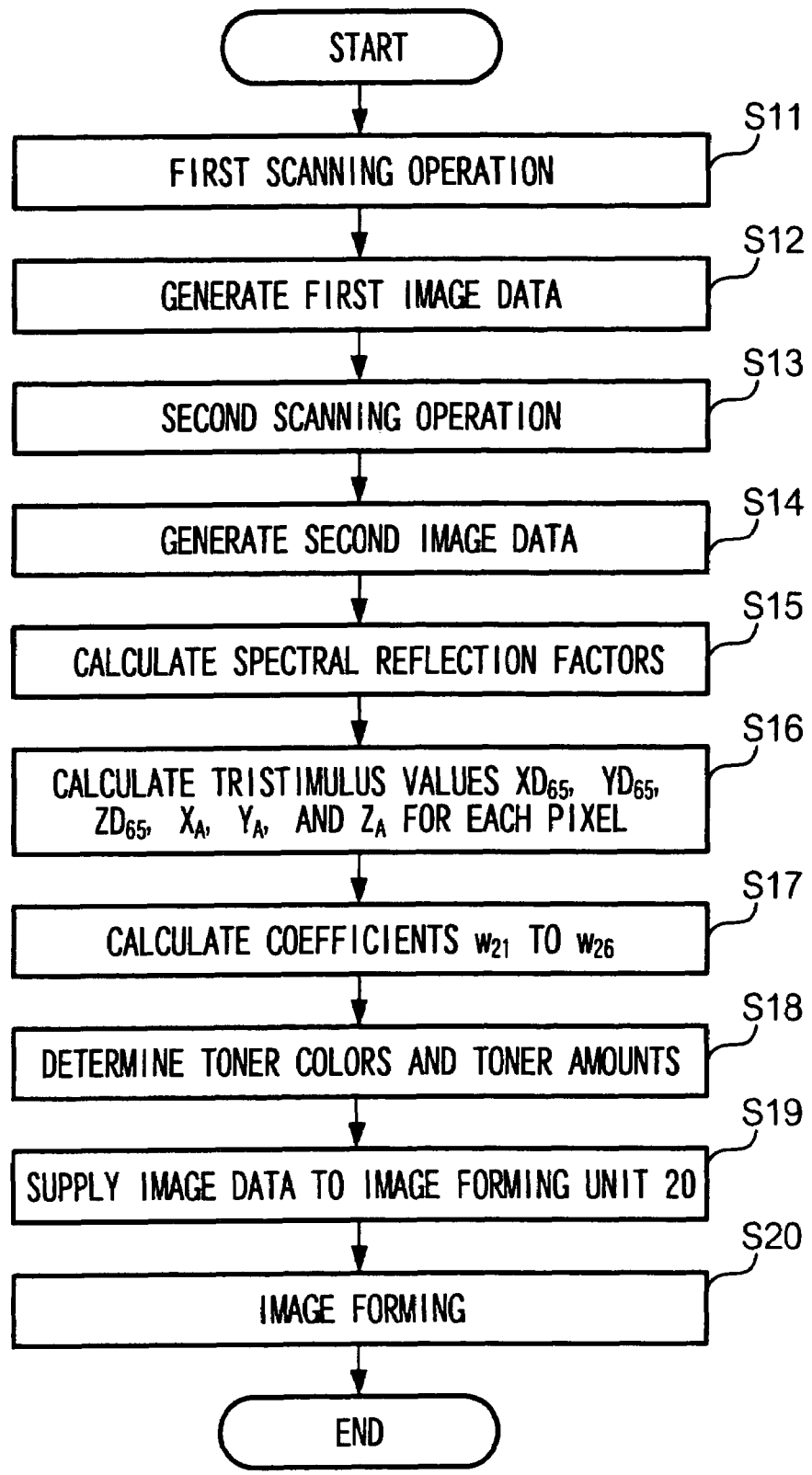
FIG. 18 is a flowchart showing an operation procedure of an image forming device according to the second embodiment.

FIG. 18 is a flowchart showing an operation procedure of an image formed on a recording sheet P after a scanning operation is performed on an object O to be imaged.

According to FIG. 18, an object O to be imaged is put on the platen glass 11, and an operator gives an instruction to start image forming. Then, the image reading unit 10 carries out a first scanning operation by irradiating the object O with light from the first light source 131 (step S11). Subsequently, the controller 30 supplies a generated image signal to the image processing unit 50, which generates first image data (step S12). Further, the image reading unit 10 carries out a second scanning operation by irradiating the object O to be imaged with light from the second light source 132 (step S13). The controller 30 then supplies a generated image signal to the image processing unit 50. The image processing unit 50 generates second image data (step S14). Next, the image processing unit 50 calculates spectral reflectances for each of the pixels constituting the image data (step S15). More specifically, forty one spectral reflectances are calculated for each pixel, at wavelength intervals of $\delta=10$ nm within a wavelength range of 380 to 780 nm.

Subsequently, the image processing unit 50 calculates $X_{D65}, Y_{D65}, Z_{D65}, X_A, Y_A$, and $Z_A$ on the XYZ color coordinates for each of the pixels forming first and second data, based on the spectral reflectances calculated in step S51 (step S16). Further, the image processing unit 50 calculates the coefficients $w_{21}$ to $w_{26}$ to obtain a spectral reflectance estimation function $\rho_2(\lambda)$ (step S17).

Subsequently, based on values of the spectral reflectance estimation function $\rho_2(\lambda)$ within the medium wavelength range of 400 to 700 nm, the image processing unit 50 executes a color space processing and a screen processing on image data and determines colors and amounts of toners to be applied to areas corresponding to the respective pixels of the image data (step S18).

When determining toner amounts, the controller 30 specifies mixing ratios between colors of toners (or coloring materials) of cyan, magenta, yellow, black, red, orange, green, and blue and also specifies shapes of screen dots for each pixel, depending on colors expressed by values of the spectral reflectance estimation function $\rho_2(\lambda)$ determined by the coefficients $w_{21}$ to $w_{26}$ within the medium wavelength range of 400 to 700 mm. The controller 30 may further determine whether or not a transparent toner should be used, depending on an image expressed by the image data. For example, if the image data is a monochrome document data which requires toners of a small number of colors, the controller 30 sets zero as a toner amount of the transparent toner. Otherwise, if the image has a lot of colors, i.e., if toners of a large number of colors are used, the controller 30 applies a predetermined amount of a transparent toner to the entire surface of the image data.

The controller 30 supplies the image forming unit 20 with the image data including information indicative of mixing ratios, area ratios, and screen dots concerning toners of respective colors for each pixel (step S19). Based on the image data, the image forming unit 20 forms an image on a recording sheet P (step S20) using plural toners.

The second embodiment is configured as described above.

The first and second embodiments as described above may be modified as follows. The following modifications may be arbitrarily combined with one another.

The above embodiments have been described as reference examples to the image processing unit 50 built in the image forming device 1. However, the image processing unit is not limited to a structure in which an image processing unit is built in an image forming device. The image processing unit may be included in, for example, a computer which executes image processing. In this case, the image forming device performs necessary processing on the basis of values of a spectral reflectance estimation function expressed by linear combination of coefficients and eigenvectors obtained as described above, within the visible light range excluding low and high wavelength ranges. Information obtained by the processing is output to an external device such as an image forming device. The information may represent amounts of plural coloring materials, which the image forming device calculates, or may present the spectral reflectance estimation function itself. At the same time, the image processing device may output stimulus values together. According to this modification, a user of the information processing device supplied with the information may visually check stimulus values and determine colors, with the stimulus values displayed on a display device (not shown).

In the second embodiment, amounts of coloring materials and the like are calculated using stimulus values $x(\lambda), y(\lambda)$, and $z(\lambda)$ related to a wavelength range defined by excluding the low wavelength range of (380 to 400 nm) and the high wavelength range of (700 to 780 nm) from the wavelength range of 380 to 780 nm. However, only the low or the high wavelength range may be a target wavelength range to be excluded. For example, in order to obtain accurately stimulus values $x(\lambda), y(\lambda)$, and $z(\lambda)$ about a range of 400 to 440 nm or so, only the "low wavelength range" needs to be set as a target wavelength range to be excluded. Inversely, only the "high wavelength range" needs to be set as a target wavelength range to be excluded, in order to obtain accurately stimulus values $x(\lambda), y(\lambda)$, and $z(\lambda)$ about a range of 660 to 700 nm or so.

Also in the second embodiment, a target wavelength range for which stimulus values $x(\lambda), y(\lambda)$, and $z(\lambda)$ are calculated is set to 380 to 780 nm. Of this target wavelength range, the low wavelength range is set to 380 to 400 nm and the high wavelength range is set to 700 to 780 nm. These numerical values are merely examples and may be changed.

In the above embodiments, the first light source 131 has been described as a light source for irradiating standard light $D_{65}$, as well as the second light source 132 as a light source for irradiating standard light A. However, any type of light source may be used as far as spectral energy distributions of the first and second light sources differ from each other within a wavelength range for which a spectral reflectance estimation function is obtained. Independently from types of light sources, six is the number of stimulus values obtained on the basis of spectral reflectances extracted from the image data, and is thus equal to the number of eigenvectors. Accordingly, coefficients may be calculated uniquely from relation equations such as equations 2 to 7 and 9 to 14 representing relationships between the stimulus values and the eigenvectors, to specify a spectral reflectance estimation function.

Although the above embodiments have described the number of eigenvectors to be six, the number of eigenvectors is not limited to six. As shown in FIG. 6 described previously, as the number of eigenvectors increases, the accumulated contributing rate relative to a population improves, and therefore, differences between a spectral reflectance estimation function and original spectral reflectances of an object to be imaged decrease. For example, if the number of eigenvectors is nine, the accumulated contributing rate further rises close to 100%.

However, in order to uniquely calculate coefficients for the nine eigenvectors, first-degree equations, each having nine coefficients is required concerning stimulus values. That is, nine different stimulus values need to be obtained. It is therefore necessary to perform scanning operations using different three light sources. Specifically, a third scanning operation is carried out using a light source for irradiating auxiliary standard light $D_{50}$ in addition to first and second scanning operations. The auxiliary standard light $D_{50}$ is a light source having a color temperature of 5,000 K and has a substantially uniform spectral energy distribution throughout the visible light range of about 400 to 700 nm (approximately uniform within a range of 380 to 780 nm). According to this modification, coefficients for all the nine eigenvectors may be uniquely calculated from relationships between the nine different stimulus values and the spectral reflectance estimation function.

Also in the above embodiments, the image forming device 1 uses stimulus values on the XYZ color coordinates, as color values. As an alternative, color values according to CIELAB color space may be used. Stimulus values on the XYZ color coordinates are desirable to determine what colors are expressed on a certain observation condition. However, stimulus values on the XYZ color coordinates are inconvenient for clearly expressing differences between colors. In this respect, difference between colors may be expressed quantitatively by using color values according to the CIELAB color space. Therefore, color values according to the CIELAB color space are convenient, for example, when in need of distinguishing a slight difference between colors. As a further alternative, there may be a method of obtaining coefficients by using stimulus values on the XYZ color coordinates and then converting the stimulus values into color values according to the CIELAB color space. Otherwise, color values according to other color space may be used in place of values according to the CIELAB color space.

Also in the above embodiments, toner images are formed using toners of eight colors and a transparent toner wherein the eight colors are cyan, magenta, yellow, black, red, orange, green, and blue. Colors used in the invention are not limited to these colors. One or more arbitrary toners among these toners may be contained in an image forming device to perform developing.

The first embodiment employs a line sensor having thirty one columns of light receiving elements, and the second embodiment employs forty one columns. However, the number of columns of light receiving elements may be more or less than thirty one and forty one. The second embodiment is then required to be able to receive light of a necessary wavelength range, so that processing is carried out within a medium wavelength range defined by excluding a low and a high wavelength ranges from a visible light range, for the spectral reflectance estimation function. In view of a purpose of reading more colors from an object than three colors of R, G, and B as read by related arts, at least four columns of light receiving elements are required. Even with use of one single column of light receiving elements, there is an available method of scanning one object plural times while switching plural color filters.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device comprising:
   a spectral reflectance calculation unit that calculates a spectral reflectance within a wavelength range including wavelengths of visible light, for each of at least two types of irradiation light having respectively different spectral energy distributions, on the basis of intensities of reflection light from an object to be imaged when the object to be imaged is irradiated with at least two types of irradiation light and on the basis of irradiation intensities of at least two types of irradiation light;
   a color value calculation unit that obtains color values based on the spectral reflectances calculated by the spectral reflectance calculation unit;
   a coefficient calculation unit that calculates coefficients respectively for a plurality of predetermined eigenvectors where the color values are expressed by a linear combination between the plurality of predetermined eigenvectors, the coefficients, and spectral energies of at least two types of irradiation light; and
   an output unit that generates and outputs information corresponding to an estimation values within a wavelength range defined by excluding at least one of a low and a high wavelength ranges from the wavelength range including the wavelengths of visible light, the estimated value being one of estimation values of the spectral reflectances expressed by linear combination between the respective coefficients calculated by the coefficient calculation unit and the eigenvectors.

2. The image processing device according to claim 1, wherein the output unit calculates an amount of each of a plurality of coloring materials required for reproducing colors expressed by the linear combination between the respective coefficients calculated by the coefficient calculation unit and the eigenvectors, and outputs the amounts of the plurality of coloring materials as the information corresponding to the estimation values.

3. The image processing device according to claim 1, wherein the number of the plurality of eigenvectors is six.

4. The image processing device according to claim 1, wherein the wavelength range including the wavelengths of visible light is a wavelength range of 380 to 780 nm.

5. The image processing device according to claim 4, wherein in the wavelength range including the wavelengths of visible light, the low wavelength range is a wavelength range of 380 to 400 nm.

6. The image processing device according to claim 4, wherein in the wavelength range including the wavelengths of visible light, the high wavelength range is a wavelength range of 700 to 780 nm.

7. An image processing device comprising:
   an irradiation unit that irradiates an object to be imaged with at least two types of irradiation light having respectively different spectral energy distributions;
   a detection unit that detects an intensity of reflection light from the object irradiated with the irradiation light by the irradiation unit, for each of the at least two types of irradiation light;
   a spectral reflectance calculation unit that calculates a spectral reflectance within a wavelength range including wavelengths of visible light, for each of at least two types of irradiation light, on the basis of the intensities detected by the detection unit when the object to be imaged is irradiated with at least two types of irradiation light and on the basis of irradiation intensities of at least two types of irradiation light from the irradiation unit;

a color value calculation unit that obtains color values based on the spectral reflectances calculated by the spectral reflectance calculation unit;

a coefficient calculation unit that calculates coefficients respectively for a plurality of predetermined eigenvectors where the color values are expressed by a linear combination between the plurality of predetermined eigenvectors, the coefficients, and spectral energies of at least two types of irradiation light; and an output unit that generates and outputs information corresponding to an estimation values within a wavelength range defined by excluding at least one of a low and a high wavelength ranges from the wavelength range including the wavelengths of visible light, the estimated value being one of estimation values of the spectral reflectances expressed by linear combination between the respective coefficients calculated by the coefficient calculation unit and the eigenvectors.

8. An image processing device comprising:

an irradiation unit that irradiates an object to be imaged with at least two types of irradiation light having respectively different spectral energy distributions;

a detection unit that detects an intensity of reflection light from the object irradiated with the irradiation light by the irradiation unit, for each of at least two types of irradiation light;

a spectral reflectance calculation unit that calculates a spectral reflectance within a wavelength range including wavelengths of visible light, for each of at least two types of irradiation light, on the basis of the intensities detected by the detection unit when the object to be imaged is irradiated with at least two types of irradiation light and on the basis of irradiation intensities of at least two types of irradiation light from the irradiation unit;

a color value calculation unit that obtains color values based on the spectral reflectances calculated by the spectral reflectance calculation unit;

a coefficient calculation unit that calculates coefficients respectively for a plurality of predetermined eigenvectors where the color values are expressed by linear combination between the plurality of predetermined eigenvectors, the coefficients, and spectral energies of at least two types of irradiation light;

a coloring material calculation unit that calculates amounts of a plurality of coloring materials required for expressing colors corresponding to estimation values within a wavelength range defined by excluding at least one of a low and a high wavelength ranges from the wavelength range including the wavelengths of visible light, the estimated value being one of estimation values of the spectral reflectances expressed by linear combination between the respective coefficients calculated by the coefficient calculation unit and the eigenvectors; and an image forming unit that forms an image on a recording material, using the coloring materials of the amounts calculated by the coloring material calculation unit.

* * * * *